United States Patent
Kamen et al.

(10) Patent No.: US 9,442,491 B2
(45) Date of Patent: *Sep. 13, 2016

(54) CONTROL OF A PERSONAL TRANSPORTER BASED ON USER POSITION

(71) Applicant: DEKA Products Limited Partnership, Manchester, NH (US)

(72) Inventors: Dean Kamen, Bedford, NH (US); Robert R. Ambrogi, Manchester, NH (US); James J. Dattolo, Somerville, MA (US); Robert J. Duggan, Strafford, NH (US); J. Douglas Field, Bedford, NH (US); Richard Kurt Heinzmann, Francestown, NH (US); Matthew M. McCambridge, Madison, WI (US); John B. Morrell, Bedford, NH (US); Michael D. Piedmonte, Warrenton, VA (US); Richard J. Rosasco, Millersville, MD (US)

(73) Assignee: DEKA Products Limited Partnership, Manchester, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/620,284

(22) Filed: Feb. 12, 2015

(65) Prior Publication Data
US 2015/0153739 A1 Jun. 4, 2015

Related U.S. Application Data

(60) Continuation of application No. 14/446,969, filed on Jul. 30, 2014, which is a continuation of application No. 13/857,737, filed on Apr. 5, 2013, now Pat. No. 8,830,048, which is a continuation of application No.

(Continued)

(51) Int. Cl.
*B60Q 1/00* (2006.01)
*G05D 1/08* (2006.01)

(Continued)

(52) U.S. Cl.
CPC ............ *G05D 1/0891* (2013.01); *A63C 17/01* (2013.01); *A63C 17/08* (2013.01); *A63C 17/12* (2013.01);

(Continued)

(58) Field of Classification Search
CPC .............. B62K 2204/00; A63C 17/12; B60L 11/1851; B60L 11/1861
USPC .......... 340/905, 441, 936, 439; 701/93, 117, 701/119; 180/170; 246/182 R
See application file for complete search history.

(56) References Cited

U.S. PATENT DOCUMENTS

| 584,127 A | 6/1897 | Draullette et al. |
| 849,270 A | 4/1907 | Schafer et al. |

(Continued)

FOREIGN PATENT DOCUMENTS

| CA | 2 580 632 A1 | 3/2006 |
| CA | 2 822 729 A1 | 3/2006 |

(Continued)

OTHER PUBLICATIONS

File History for U.S. Pat. No. 8,453,768, U.S. Appl. No. 11/691,903.

(Continued)

*Primary Examiner* — Daryl Pope
(74) *Attorney, Agent, or Firm* — McCormick, Paulding & Huber LLP

(57) ABSTRACT

An apparatus controller for prompting a rider to be positioned on a vehicle in such a manner as to reduce lateral instability due to lateral acceleration of the vehicle. The apparatus has an input for receiving specification from the rider of a desired direction of travel, and indicating means for reflecting to the rider a propitious instantaneous body orientation to enhance stability in the face of lateral acceleration. The indicating may include a handlebar that is pivotable with respect to the vehicle and that is driven in response to vehicle turning.

20 Claims, 21 Drawing Sheets

Related U.S. Application Data

13/585,041, filed on Aug. 14, 2012, now abandoned, which is a continuation of application No. 12/879,650, filed on Sep. 10, 2010, now Pat. No. 8,248,222, which is a continuation of application No. 11/863,640, filed on Sep. 28, 2007, now Pat. No. 7,812,715, which is a division of application No. 10/939,955, filed on Sep. 13, 2004, now Pat. No. 7,275,607, which is a continuation-in-part of application No. 10/308,850, filed on Dec. 3, 2002, now Pat. No. 6,789,640, said application No. 10/939,955 is a continuation-in-part of application No. 10/044,590, filed on Jan. 11, 2002, now abandoned, which is a division of application No. 09/635,936, filed on Aug. 10, 2000, now Pat. No. 6,367,817, which is a division of application No. 09/325,978, filed on Jun. 4, 1999, now Pat. No. 6,302,230.

(60) Provisional application No. 60/388,846, filed on Jun. 14, 2002.

(51) Int. Cl.

| | | |
|---|---|---|
| *A63C 17/01* | (2006.01) | |
| *A63C 17/08* | (2006.01) | |
| *A63C 17/12* | (2006.01) | |
| *B62D 37/00* | (2006.01) | |
| *B62D 51/00* | (2006.01) | |
| *B62D 51/02* | (2006.01) | |
| *B62D 61/00* | (2006.01) | |
| *B62K 1/00* | (2006.01) | |
| *B62K 3/00* | (2006.01) | |
| *B60L 15/20* | (2006.01) | |
| *G08B 6/00* | (2006.01) | |
| *G05D 1/02* | (2006.01) | |

(52) U.S. Cl.
CPC ............ *B60L 15/20* (2013.01); *B60L 15/2045* (2013.01); *B62D 37/00* (2013.01); *B62D 51/002* (2013.01); *B62D 51/02* (2013.01); *B62D 61/00* (2013.01); *B62K 1/00* (2013.01); *B62K 3/007* (2013.01); *G05D 1/0212* (2013.01); *G05D 1/0223* (2013.01); *G08B 6/00* (2013.01); *Y02T 10/7258* (2013.01)

(56) References Cited

U.S. PATENT DOCUMENTS

| | | |
|---|---|---|
| D880,823 | 3/1908 | Redfield |
| 2,224,411 A | 12/1940 | Smith |
| 2,415,056 A | 1/1947 | Wheeler |
| 2,618,447 A | 11/1952 | Lecarme |
| 2,742,973 A | 4/1956 | Johannesen |
| 3,017,199 A | 1/1962 | Sechrist |
| 3,145,797 A | 8/1964 | Taylor |
| 3,179,355 A | 4/1965 | Pickering et al. |
| 3,260,324 A | 7/1966 | Suarez |
| 3,283,398 A | 11/1966 | Andren |
| 3,288,234 A | 11/1966 | Feliz |
| 3,306,626 A | 2/1967 | Kawada |
| 3,313,365 A | 4/1967 | Jackson |
| 3,338,328 A | 8/1967 | Cataldo |
| 3,348,518 A | 10/1967 | Forsyth |
| 3,374,845 A | 3/1968 | Selwyn |
| 3,399,742 A | 9/1968 | Malick |
| 3,446,304 A | 5/1969 | Alimanestiano |
| 3,450,219 A | 6/1969 | Fleming |
| 3,515,401 A | 6/1970 | Gross |
| 3,580,344 A | 5/1971 | Floyd |
| 3,596,298 A | 8/1971 | Durst, Jr. |
| 3,628,624 A | 12/1971 | Wesener |
| 3,718,342 A | 2/1973 | Freed |
| 3,787,066 A | 1/1974 | Hautier |
| 3,790,150 A | 2/1974 | Lippert |
| 3,860,264 A | 1/1975 | Douglas et al. |
| 3,872,945 A | 3/1975 | Hickman et al. |
| 3,952,822 A | 4/1976 | Udden et al. |
| 3,965,402 A | 6/1976 | Mogle |
| 3,993,154 A | 11/1976 | Simmons et al. |
| 4,018,440 A | 4/1977 | Deutsch |
| 4,062,558 A | 12/1977 | Wasserman |
| 4,065,145 A | 12/1977 | Chambers |
| 4,065,146 A | 12/1977 | Denzer |
| 4,076,270 A | 2/1978 | Winchell |
| 4,078,627 A | 3/1978 | Brown et al. |
| 4,087,107 A | 5/1978 | Winchell |
| 4,088,199 A | 5/1978 | Trautwein |
| 4,094,372 A | 6/1978 | Notter |
| 4,109,741 A | 8/1978 | Gabriel |
| 4,111,445 A | 9/1978 | Haibeck |
| 4,140,200 A | 2/1979 | Tucek |
| 4,151,892 A | 5/1979 | Francken |
| 4,222,449 A | 9/1980 | Feliz |
| 4,264,082 A | 4/1981 | Fouchey, Jr. |
| 4,266,627 A | 5/1981 | Lauber |
| 4,274,503 A | 6/1981 | Mackintosh |
| 4,281,734 A | 8/1981 | Johnston |
| 4,293,052 A | 10/1981 | Daswick et al. |
| 4,307,788 A | 12/1981 | Shelton |
| 4,325,565 A | 4/1982 | Winchell |
| 4,354,569 A | 10/1982 | Eichholz |
| 4,363,493 A | 12/1982 | Veneklasen |
| 4,373,600 A | 2/1983 | Buschbom et al. |
| 4,375,840 A | 3/1983 | Campbell |
| 4,413,693 A | 11/1983 | Derby |
| 4,414,937 A | 11/1983 | Ueda et al. |
| 4,484,648 A | 11/1984 | Jephcott |
| 4,510,956 A | 4/1985 | King |
| 4,556,997 A | 12/1985 | Takamiya et al. |
| 4,560,022 A | 12/1985 | Kassai |
| 4,566,707 A | 1/1986 | Nitzberg |
| 4,570,078 A | 2/1986 | Yashima et al. |
| 4,571,844 A | 2/1986 | Komasaku et al. |
| 4,624,469 A | 11/1986 | Bourne, Jr. |
| 4,657,271 A | 4/1987 | Salmon |
| 4,657,272 A | 4/1987 | Davenport |
| 4,685,693 A | 8/1987 | Vadjunec |
| 4,709,772 A | 12/1987 | Brunet |
| 4,712,806 A | 12/1987 | Patrin |
| 4,716,980 A | 1/1988 | Butler |
| 4,732,353 A | 3/1988 | Studer |
| 4,740,001 A | 4/1988 | Torleumke |
| 4,746,132 A | 5/1988 | Eagan |
| 4,750,578 A | 6/1988 | Brandenfels |
| 4,770,410 A | 9/1988 | Brown |
| 4,778,133 A | 10/1988 | Sakurai |
| 4,786,069 A | 11/1988 | Tang |
| 4,790,400 A | 12/1988 | Sheeter |
| 4,790,548 A | 12/1988 | Decelles et al. |
| 4,794,730 A | 1/1989 | Fischbach |
| 4,794,999 A | 1/1989 | Hester |
| 4,796,716 A | 1/1989 | Masuda |
| 4,797,826 A | 1/1989 | Onogi et al. |
| 4,798,255 A | 1/1989 | Wu |
| 4,802,542 A | 2/1989 | Houston et al. |
| 4,809,804 A | 3/1989 | Houston et al. |
| 4,834,200 A | 5/1989 | Kajita |
| 4,837,694 A | 6/1989 | Narita et al. |
| 4,840,248 A | 6/1989 | Silverman |
| 4,863,182 A | 9/1989 | Chern |
| 4,867,188 A | 9/1989 | Reid |
| 4,869,279 A | 9/1989 | Hedges |
| 4,874,055 A | 10/1989 | Beer |
| 4,890,853 A | 1/1990 | Olson |
| 4,897,070 A | 1/1990 | Wagstaff |
| 4,913,252 A | 4/1990 | Bartley et al. |
| 4,919,225 A | 4/1990 | Sturges |
| 4,941,854 A | 7/1990 | Takahashi et al. |
| 4,944,360 A | 7/1990 | Sturges |
| 4,953,851 A | 9/1990 | Sherlock et al. |

(56) References Cited

U.S. PATENT DOCUMENTS

| | | |
|---|---|---|
| 4,964,679 A | 10/1990 | Rath |
| 4,967,862 A | 11/1990 | Pong et al. |
| 4,973,071 A | 11/1990 | Ishizaki |
| 4,984,754 A | 1/1991 | Yarrington |
| 4,985,947 A | 1/1991 | Ethridge |
| 4,998,596 A | 3/1991 | Miksitz |
| 5,001,636 A | 3/1991 | Shiraishi et al. |
| 5,002,295 A | 3/1991 | Lin |
| 5,011,171 A | 4/1991 | Cook |
| 5,012,176 A | 4/1991 | LaForge |
| RE33,675 E | 8/1991 | Young |
| 5,044,457 A | 9/1991 | Aikman |
| 5,052,237 A | 10/1991 | Reimann |
| 5,088,761 A | 2/1992 | Takehara et al. |
| 5,098,041 A | 3/1992 | Uetrecht |
| 5,111,899 A | 5/1992 | Reimann |
| 5,124,938 A | 6/1992 | Algrain |
| 5,125,468 A | 6/1992 | Coker |
| 5,136,219 A | 8/1992 | Takahashi et al. |
| 5,158,493 A | 10/1992 | Morgrey |
| 5,161,820 A | 11/1992 | Vollmer |
| 5,165,711 A | 11/1992 | Tsai |
| 5,168,947 A | 12/1992 | Rodenborn |
| 5,171,173 A | 12/1992 | Henderson et al. |
| 5,186,270 A | 2/1993 | West |
| 5,199,297 A | 4/1993 | Lin et al. |
| 5,208,521 A | 5/1993 | Aoyama |
| 5,215,159 A | 6/1993 | Nishida |
| 5,217,246 A | 6/1993 | Williams et al. |
| 5,221,883 A | 6/1993 | Takenaka et al. |
| 5,241,875 A | 9/1993 | Kochanneck |
| 5,248,007 A | 9/1993 | Watkins et al. |
| 5,261,503 A | 11/1993 | Yasui |
| 5,274,576 A | 12/1993 | Williams |
| 5,276,624 A | 1/1994 | Ito et al. |
| 5,297,646 A | 3/1994 | Yamamura et al. |
| 5,307,888 A | 5/1994 | Urvoy |
| 5,307,892 A | 5/1994 | Phillips |
| 5,314,034 A | 5/1994 | Chittal |
| 5,350,033 A | 9/1994 | Kraft |
| 5,366,036 A | 11/1994 | Perry |
| 5,369,580 A | 11/1994 | Monji et al. |
| 5,376,868 A | 12/1994 | Toyoda et al. |
| D355,148 S | 2/1995 | Orsolini |
| 5,388,658 A | 2/1995 | Ando et al. |
| 5,397,890 A | 3/1995 | Schueler et al. |
| 5,408,411 A | 4/1995 | Nakamura et al. |
| 5,417,298 A | 5/1995 | Shibahata |
| 5,419,624 A | 5/1995 | Adler et al. |
| 5,430,432 A | 7/1995 | Camhi et al. |
| 5,450,919 A | 9/1995 | Shitani |
| 5,465,806 A | 11/1995 | Higasa et al. |
| 5,482,125 A | 1/1996 | Pagett |
| 5,502,432 A | 3/1996 | Ohmamyuda et al. |
| 5,576,959 A | 11/1996 | Hrovat et al. |
| 5,645,135 A | 7/1997 | Peterson, Jr. |
| 5,646,845 A | 7/1997 | Gudat et al. |
| 5,649,605 A | 7/1997 | Ronne et al. |
| 5,652,486 A | 7/1997 | Mueller et al. |
| 5,657,828 A | 8/1997 | Nagamachi |
| 5,676,217 A | 10/1997 | Torii et al. |
| 5,695,021 A | 12/1997 | Schaffner et al. |
| 5,701,965 A | 12/1997 | Kamen et al. |
| 5,701,968 A | 12/1997 | Wright-Ott et al. |
| 5,705,746 A | 1/1998 | Trost et al. |
| 5,732,379 A | 3/1998 | Eckert et al. |
| 5,743,347 A | 4/1998 | Gingerich |
| 5,746,282 A | 5/1998 | Fujiwara et al. |
| 5,757,161 A | 5/1998 | Ikkai et al. |
| 5,769,441 A | 6/1998 | Namngani |
| 5,774,819 A | 6/1998 | Yamamoto et al. |
| 5,775,452 A | 7/1998 | Patmont |
| 5,791,425 A | 8/1998 | Kamen et al. |
| 5,794,730 A | 8/1998 | Kamen |
| 5,799,745 A | 9/1998 | Fukatani |
| 5,826,209 A | 10/1998 | Matsuno |
| 5,848,660 A | 12/1998 | McGreen |
| 5,850,136 A | 12/1998 | Kaneko |
| 5,869,943 A | 2/1999 | Nakashima et al. |
| 5,869,946 A | 2/1999 | Carobolante |
| 5,893,896 A | 4/1999 | Imamura et al. |
| 5,925,084 A | 7/1999 | Gotoh et al. |
| 5,927,414 A | 7/1999 | Kan et al. |
| 5,928,309 A | 7/1999 | Korver et al. |
| 5,931,254 A | 8/1999 | Loraas et al. |
| 5,931,421 A | 8/1999 | Surauer et al. |
| 5,939,864 A | 8/1999 | Lenhart et al. |
| 5,957,410 A | 9/1999 | Bruederle et al. |
| 5,965,991 A | 10/1999 | Koike et al. |
| 5,971,091 A | 10/1999 | Kamen et al. |
| 5,973,463 A | 10/1999 | Okuda et al. |
| 5,975,225 A | 11/1999 | Kamen et al. |
| 5,979,586 A | 11/1999 | Farmer et al. |
| 5,986,221 A | 11/1999 | Stanley |
| 6,002,975 A | 12/1999 | Schiffmann et al. |
| 6,003,624 A | 12/1999 | Jorgensen et al. |
| 6,024,182 A | 2/2000 | Hamada et al. |
| 6,036,619 A | 3/2000 | Tashiro et al. |
| 6,037,861 A | 3/2000 | Ying |
| 6,037,862 A | 3/2000 | Ying |
| 6,039,142 A | 3/2000 | Eckstein et al. |
| 6,050,357 A | 4/2000 | Staelin et al. |
| 6,052,647 A | 4/2000 | Parkinson et al. |
| 6,059,062 A | 5/2000 | Staelin et al. |
| 6,062,600 A | 5/2000 | Kamen et al. |
| 6,065,558 A | 5/2000 | Wielenga |
| 6,076,033 A | 6/2000 | Hamada et al. |
| 6,089,680 A | 7/2000 | Yoshioka et al. |
| 6,105,704 A | 8/2000 | Hamada et al. |
| 6,123,398 A | 9/2000 | Arai et al. |
| 6,125,953 A | 10/2000 | Arai et al. |
| 6,125,957 A | 10/2000 | Kauffmann |
| 6,131,057 A | 10/2000 | Tamaki et al. |
| 6,141,613 A | 10/2000 | Fan |
| 6,154,692 A | 11/2000 | Cielaszyk et al. |
| 6,169,946 B1 | 1/2001 | Griessbach |
| 6,189,643 B1 | 2/2001 | Takahashi et al. |
| 6,192,305 B1 | 2/2001 | Schiffmann |
| 6,205,375 B1 | 3/2001 | Naito |
| 6,208,929 B1 | 3/2001 | Matsuno et al. |
| 6,223,104 B1 | 4/2001 | Kamen et al. |
| 6,225,977 B1 | 5/2001 | Li |
| D444,184 S | 6/2001 | Kettler |
| 6,247,548 B1 | 6/2001 | Hayashi et al. |
| 6,260,646 B1 | 7/2001 | Fernandez et al. |
| 6,263,261 B1 | 7/2001 | Brown et al. |
| 6,273,212 B1 | 8/2001 | Husted et al. |
| 6,276,471 B1 | 8/2001 | Kratzenberg et al. |
| 6,288,505 B1 | 9/2001 | Heinzmann et al. |
| 6,292,722 B1 | 9/2001 | Holmes et al. |
| 6,302,230 B1 | 10/2001 | Kamen et al. |
| 6,320,336 B1 | 11/2001 | Eguchi |
| 6,324,446 B1 | 11/2001 | Brown et al. |
| 6,325,736 B1 | 12/2001 | Hamada et al. |
| 6,328,125 B1 | 12/2001 | Van Den Brink et al. |
| 6,332,103 B1 | 12/2001 | Steenson, Jr. et al. |
| 6,332,104 B1 | 12/2001 | Brown et al. |
| 6,356,188 B1 | 3/2002 | Meyers et al. |
| 6,357,544 B1 | 3/2002 | Kamen et al. |
| 6,360,996 B1 | 3/2002 | Bockman et al. |
| 6,367,817 B1 | 4/2002 | Kamen et al. |
| 6,371,228 B1 | 4/2002 | Husted et al. |
| 6,388,580 B1 | 5/2002 | Graham |
| 6,415,215 B1 | 7/2002 | Nishizaki et al. |
| 6,435,535 B1 | 8/2002 | Field et al. |
| 6,435,538 B2 | 8/2002 | Ellis et al. |
| 6,463,369 B2 | 10/2002 | Sadano et al. |
| 6,502,011 B2 | 12/2002 | Haag |
| 6,538,411 B1 | 3/2003 | Field et al. |
| 6,543,564 B1 | 4/2003 | Kamen et al. |
| 6,556,909 B2 | 4/2003 | Matsumoto et al. |
| 6,561,294 B1 | 5/2003 | Kamen et al. |
| 6,562,511 B2 | 5/2003 | Daroux et al. |
| 6,571,176 B1 | 5/2003 | Shinmura et al. |

(56) References Cited

U.S. PATENT DOCUMENTS

| | | |
|---|---|---|
| 6,571,892 B2 | 6/2003 | Kamen et al. |
| 6,581,714 B1 | 6/2003 | Kamen et al. |
| 6,586,901 B1 | 7/2003 | Singer et al. |
| 6,593,849 B2 | 7/2003 | Chubb et al. |
| 6,614,343 B1 | 9/2003 | Fennel et al. |
| 6,643,451 B1 | 11/2003 | Tokura et al. |
| 6,654,675 B2 | 11/2003 | Pedersen et al. |
| 6,659,211 B2 | 12/2003 | Esposito |
| 6,659,570 B2 | 12/2003 | Nakamura |
| 6,694,225 B2 | 2/2004 | Aga et al. |
| 6,704,622 B2 | 3/2004 | Tinskey et al. |
| D489,027 S | 4/2004 | Waters |
| D489,029 S | 4/2004 | Waters |
| D489,300 S | 5/2004 | Chang et al. |
| 6,752,231 B2 | 6/2004 | Hume |
| D493,127 S | 7/2004 | Waters et al. |
| D493,128 S | 7/2004 | Waters et al. |
| D494,099 S | 8/2004 | Maurer et al. |
| 6,781,960 B1 | 8/2004 | Charas |
| 6,789,640 B1 | 9/2004 | Arling et al. |
| 6,796,396 B2 | 9/2004 | Kamen et al. |
| 6,866,107 B2 | 3/2005 | Heinzmann et al. |
| 6,868,931 B2 | 3/2005 | Morrell et al. |
| 6,889,784 B2 | 5/2005 | Troll |
| 6,907,949 B1 | 6/2005 | Wang |
| D507,206 S | 7/2005 | Wang |
| 6,969,079 B2 | 11/2005 | Kamen et al. |
| 7,006,901 B2 | 2/2006 | Wang |
| 7,017,686 B2 | 3/2006 | Kamen et al. |
| 7,090,040 B2 | 8/2006 | Kamen et al. |
| D528,468 S | 9/2006 | Arling et al. |
| 7,174,976 B2 | 2/2007 | Kamen et al. |
| 7,178,611 B2 | 2/2007 | Zupanick |
| 7,178,614 B2 | 2/2007 | Ishii |
| 7,198,223 B2 | 4/2007 | Phelps, III et al. |
| 7,210,544 B2 | 5/2007 | Kamen et al. |
| D551,592 S | 9/2007 | Chang et al. |
| D551,722 S | 9/2007 | Chang et al. |
| 7,275,607 B2 | 10/2007 | Kamen et al. |
| 7,303,032 B2 | 12/2007 | Kahlert et al. |
| 7,363,993 B2 | 4/2008 | Ishii |
| 7,370,713 B1 | 5/2008 | Kamen |
| 7,481,291 B2 | 1/2009 | Nishikawa |
| 7,546,889 B2 | 6/2009 | Kamen et al. |
| 7,589,643 B2 | 9/2009 | Dagci et al. |
| D601,922 S | 10/2009 | Imai et al. |
| 7,688,191 B2 | 3/2010 | Lu et al. |
| 7,703,568 B2 | 4/2010 | Ishii |
| 7,789,174 B2 | 9/2010 | Kamen et al. |
| 7,857,088 B2 | 12/2010 | Field et al. |
| 7,958,956 B2 | 6/2011 | Kakinuma et al. |
| 8,014,923 B2 | 9/2011 | Ishii et al. |
| 8,028,777 B2 | 10/2011 | Kakinuma et al. |
| 8,074,388 B2 | 12/2011 | Trainer |
| 8,091,672 B2 | 1/2012 | Gutsch et al. |
| 8,162,089 B2 | 4/2012 | Shaw |
| 8,170,780 B2 | 5/2012 | Field et al. |
| 8,186,462 B2 | 5/2012 | Kamen et al. |
| 8,225,891 B2 | 7/2012 | Takenaka et al. |
| 8,248,222 B2 | 8/2012 | Kamen et al. |
| 8,285,474 B2 | 10/2012 | Doi |
| 8,417,404 B2 | 4/2013 | Yen et al. |
| 8,467,941 B2 | 6/2013 | Field et al. |
| 8,490,723 B2 | 7/2013 | Heinzmann et al. |
| 8,584,782 B2 | 11/2013 | Chen |
| 8,639,416 B2 | 1/2014 | Jones et al. |
| 8,640,807 B2 | 2/2014 | Takenaka |
| 8,684,123 B2 | 4/2014 | Chen |
| 8,738,238 B2 | 5/2014 | Rekow |
| 8,738,278 B2 | 5/2014 | Chen |
| 8,807,250 B2 | 8/2014 | Chen |
| 8,830,048 B2* | 9/2014 | Kamen et al. ............... 340/439 |
| 8,978,791 B2 | 3/2015 | Ha et al. |
| 9,045,190 B2 | 6/2015 | Chen |
| 9,126,497 B2 | 9/2015 | Heinzmann et al. |
| 9,156,516 B2 | 10/2015 | Kahlert et al. |
| 2002/0007239 A1 | 1/2002 | Matsumoto et al. |
| 2002/0056582 A1 | 5/2002 | Chubb et al. |
| 2002/0063006 A1 | 5/2002 | Kamen et al. |
| 2002/0082749 A1 | 6/2002 | Meyers et al. |
| 2002/0121572 A1 | 9/2002 | Jacobson |
| 2003/0014167 A1 | 1/2003 | Pedersen et al. |
| 2003/0226698 A1 | 12/2003 | Kamen et al. |
| 2004/0005958 A1 | 1/2004 | Kamen et al. |
| 2004/0007399 A1 | 1/2004 | Heinzmann et al. |
| 2004/0007644 A1 | 1/2004 | Phelps, III et al. |
| 2004/0055796 A1 | 3/2004 | Kamen et al. |
| 2004/0069543 A1 | 4/2004 | Kamen et al. |
| 2004/0135434 A1* | 7/2004 | Honda ............... 307/9.1 |
| 2004/0201271 A1 | 10/2004 | Kakinuma et al. |
| 2004/0262871 A1 | 12/2004 | Schreuder et al. |
| 2005/0029023 A1 | 2/2005 | Takami et al. |
| 2005/0121866 A1 | 6/2005 | Kamen et al. |
| 2005/0134014 A1 | 6/2005 | Xie |
| 2005/0236208 A1 | 10/2005 | Runkles et al. |
| 2006/0108956 A1 | 5/2006 | Clark et al. |
| 2006/0202439 A1 | 9/2006 | Kahlert et al. |
| 2006/0231313 A1 | 10/2006 | Ishii |
| 2007/0001830 A1 | 1/2007 | Dagci et al. |
| 2007/0296170 A1 | 12/2007 | Field et al. |
| 2008/0029985 A1 | 2/2008 | Chen |
| 2008/0147281 A1 | 6/2008 | Ishii et al. |
| 2008/0174415 A1 | 7/2008 | Tanida et al. |
| 2008/0197599 A1 | 8/2008 | Comstock et al. |
| 2008/0238005 A1 | 10/2008 | James |
| 2009/0032323 A1 | 2/2009 | Kakinuma et al. |
| 2009/0078485 A1 | 3/2009 | Gutsch et al. |
| 2009/0105908 A1 | 4/2009 | Casey et al. |
| 2009/0115149 A1 | 5/2009 | Wallis et al. |
| 2009/0224524 A1 | 9/2009 | Rathsack |
| 2010/0025139 A1 | 2/2010 | Kosaka et al. |
| 2010/0114468 A1 | 5/2010 | Field et al. |
| 2010/0121538 A1 | 5/2010 | Ishii et al. |
| 2010/0222994 A1 | 9/2010 | Field et al. |
| 2010/0237645 A1 | 9/2010 | Trainer |
| 2010/0250040 A1 | 9/2010 | Yamano |
| 2011/0209929 A1 | 9/2011 | Heinzmann et al. |
| 2011/0220427 A1 | 9/2011 | Chen |
| 2011/0221160 A1 | 9/2011 | Shaw |
| 2011/0238247 A1 | 9/2011 | Yen et al. |
| 2012/0197470 A1* | 8/2012 | Inui ............... 701/22 |
| 2012/0205176 A1 | 8/2012 | Ha et al. |
| 2012/0239284 A1 | 9/2012 | Field et al. |
| 2012/0290162 A1 | 11/2012 | Stevens et al. |
| 2013/0032422 A1 | 2/2013 | Chen |
| 2013/0032423 A1 | 2/2013 | Chen |
| 2013/0105239 A1 | 5/2013 | Fung |
| 2013/0228385 A1 | 9/2013 | Chen |
| 2014/0058600 A1 | 2/2014 | Hoffmann et al. |

FOREIGN PATENT DOCUMENTS

| | | |
|---|---|---|
| CN | 101056680 A | 10/2007 |
| CN | 104071275 B | 3/2016 |
| DE | 2048593 A1 | 5/1971 |
| DE | 3103961 A1 | 9/1982 |
| DE | 3128112 A1 | 2/1983 |
| DE | 3242880 A1 | 6/1983 |
| DE | 3411489 A1 | 10/1984 |
| DE | 4110905 A1 | 10/1991 |
| DE | 4404594 A1 | 8/1995 |
| DE | 19625498 C1 | 11/1997 |
| DE | 29808091 U1 | 8/1998 |
| DE | 29808096 U1 | 8/1998 |
| DE | 102 09 093 A1 | 9/2003 |
| EP | 0109927 A2 | 5/1984 |
| EP | 0193473 A1 | 9/1986 |
| EP | 0537698 A1 | 4/1993 |
| EP | 0551986 A1 | 7/1993 |
| EP | 0663313 A1 | 7/1995 |
| EP | 0746089 A1 | 4/1996 |
| EP | 0958978 A2 | 11/1999 |
| EP | 1063530 A1 | 12/2000 |
| EP | 1 791 609 B1 | 11/2011 |

(56) References Cited

FOREIGN PATENT DOCUMENTS

| | | |
|---|---|---|
| FR | 980237 A | 5/1951 |
| FR | 2502090 A1 | 9/1982 |
| GB | 152664 A | 1/1922 |
| GB | 1213930 A | 11/1970 |
| GB | 2139576 A | 11/1984 |
| GB | 2 388 579 A | 11/2003 |
| GB | 2388579 A | 11/2003 |
| HK | 1114353 | 10/2008 |
| JP | 52-44933 A | 8/1977 |
| JP | 57-87766 A | 1/1982 |
| JP | S57-110569 A | 7/1982 |
| JP | S59-73372 A | 4/1984 |
| JP | 60-25580 A | 12/1985 |
| JP | S61-31685 U | 2/1986 |
| JP | 62-12810 | 1/1987 |
| JP | 63-305082 A | 12/1988 |
| JP | H01-316810 A | 12/1989 |
| JP | 2-190277 A | 7/1990 |
| JP | H04-201793 A | 7/1992 |
| JP | H05-213240 A | 8/1993 |
| JP | H06-171562 A | 6/1994 |
| JP | H06-105415 B2 | 12/1994 |
| JP | H07-255780 A | 10/1995 |
| JP | 09-010375 A | 1/1997 |
| JP | 9-248320 A | 9/1997 |
| JP | 10-023613 | 1/1998 |
| JP | 2000-70308 A | 3/2000 |
| JP | 2004500271 A | 1/2004 |
| JP | 2004140949 A | 5/2004 |
| JP | 2005022631 A | 1/2005 |
| JP | 1314974 S | 11/2007 |
| JP | 1323922 S | 3/2008 |
| JP | 4572594 B2 | 11/2010 |
| JP | 2011-246124 A | 12/2011 |
| JP | 5243795 B2 | 7/2013 |
| JP | 5328542 B2 | 10/2013 |
| JP | 2014-218247 A | 11/2014 |
| TW | 124942 | 9/2008 |
| TW | 124943 | 9/2008 |
| WO | 8605752 A1 | 10/1986 |
| WO | 8906117 A1 | 7/1989 |
| WO | 9623478 A1 | 8/1996 |
| WO | 9846474 A2 | 10/1998 |
| WO | 0075001 A1 | 12/2000 |
| WO | 03/068342 A1 | 8/2003 |
| WO | 2004/007264 A1 | 1/2004 |
| WO | 2006/042302 A1 | 4/2006 |
| WO | 2009/052471 A2 | 4/2009 |

OTHER PUBLICATIONS

File History for U.S. Pat. No. 8,925,657, U.S. Appl. No. 13/908,587.
File History for U.S. Pat. No. 8,248,222, U.S. Appl. No. 12/879,650.
File History for U.S. Pat. No. 6,581,714, U.S. Appl. No. 09/687,789.
File History for U.S. Appl. No. 14/446,969.
Kanoh, H., "Adaptive Control of Inverted Pendulum", Computrol, vol. 2 (1983), pp. 69-75.
Kawaji et al., "Stabilization of Unicycle Using Spinning Motion", Denki Gakkai Ronbunshi, vol. 107-D, No. 1, Japan (Jan. 1987), pp. 21-28.
Koyanagi et al., "A Wheeled Inverse Pendulum Type Self Contained Mobile Robot", The Society of Instrument and Control Engineers, Special issue of the 31st SICE Annual Conference Demonstration Session, Japan (Jul. 22, 1992), pp. 51-56.
Koyanagi et al., "A Wheeled Inverse Pendulum Type Self-Contained Mobile Robot and Its Posture Control and Vehicle Control", The Society of Instrument and Control Engineers, Special issue of the 31st SICE Annual Conference, Japan (Jul. 22, 1992), pp. 13-16.
Koyanagi et al., "A Wheeled Inverse Pendulum Type Self-Contained Mobile Robot and its Two Dimensional Trajectory Control", Proceedings of the Second International Symposium on Measurement and Control in Robotics, Japan (Nov. 15-19, 1992), pp. 891-897.
Momoi & Yamafuji, "Motion Control of the Parallel Bicycle-Type Mobile Robot Composed of a Triple Inverted Pendulum (2nd Report: Driving Control)", Paper Read at Meeting of Japan Society of Mechanical Engineering (vol. C), vol. 57, No. 541 (Sep. 1991), pp. 154-159.
Osaka et al., "Stabilization of Unicycle", Systems and Control, vol. 25, No. 3, Japan (Mar. 1981) (Abstract only), pp. 159-166.
Roy et al., "Five-Wheel Unicycle System", Medical & Biological Engineering & Computing, vol. 23, No. 6, United Kingdom (Nov. 1985), pp. 593-594.
Schoonwinkel, A., "Design and Test of a Computer-Stabilized Unicycle", Dissertation Abstracts International, vol. 49/03-B, Stanford University (1988), pp. 890-1294.
Vos et al., "Dynamics and Nonlinear Adaptive Control of an Autonomous Unicycle—Theory and Experiment", American Institute of Aeronautics and Astronautics dynamics Specialists Confernece, A90-26772 10-39, Washington, D.C. (Apr. 5-6, 1990), pp. 487-494 (Abstract only).
Vos, D., "Dynamics and Nonlinear, Adaptive Control of an Autonomous Unicycle", Massachusetts Institute of Technology, (Jun. 7, 1989).
Vos, D., "Nonlinear Control of an Autonomous Unicycle Robot: Practical Issues", Massachusetts Institute of Technology, (Jun. 5, 1992).
Yamafuji, K. and Kawamura, T., "Study of Postural and Driving Control of Coaxial Bicycle", Paper Read at Meeting of Japan Society of Mechanical Engineering (vol. C), vol. 54, No. 501, pp. 1114-1121 (May 1988).
Yamafuji, K., "A Proposal for Modular-Structured Mobile Robots for Work that Principally Involve a Vehicle with Two Parallel Wheels", Automation Technology, vol. 20, pp. 113-118 (1988).
Yamafuji et al., "Synchronous and Steering Control of Parallel Bicycle", Paper Read at Meeting of Japan Society of Mechanical Engineering (vol. C), vol. 55, No. 513, pp. 1229-1234 (May 1989).
International Search Report for Application No. PCT/US00/15144 dated Sep. 26, 2000.
International Search Report for Application No. PCT/US01/42657 dated Dec. 11, 2002.
International Search Report for Application No. PCT/US03/18940 dated Jun. 2, 2004.
International Search Report for Application No. PCT/US03/21625 dated Nov. 26, 2003.
International Search Report for Application No. PCT/US00/06668 dated Jun. 14, 2000.
File History for U.S. Pat. No. 7,370,713, U.S. Appl. No. 09/325,976.
File History for U.S. Pat. No. 7,546,889, U.S. Appl. No. 10/462,379.
Advisory Action for U.S. Appl. No. 08/474,313 dated Jun. 6, 1997.
Office Action for U.S. Appl. No. 08/474,313 dated Dec. 13, 1995.
Office Action for U.S. Appl. No. 08/474,313 dated Aug. 5, 1996.
Final Office Action for U.S. Appl. No. 08/474,313 dated Feb. 18, 1997.
Office Action for U.S. Appl. No. 10/044,590 dated Apr. 5, 2002.
Office Action for U.S. Appl. No. 10/044,590 dated Jun. 21, 2002.
Watson Industries, Inc., Vertical Reference Manual ADS-C132-1A, 1992, pp. 3-4.
Osaka et al., Systems and Control, vol. 25, No. 3, Japan 1981, pp. 159-166 (Abstract Only).
Self Supported Carrier Machine and Automatic Carrier Device Using the Same in Patent Abstracts of Japan, Dec. 21, 1989, #63149523, Japanese Patent Office, Japan.
Office Action for U.S. Appl. No. 14/619,763 dated Apr. 14, 2015.
Office Action for U.S. Appl. No. 14/619,806 dated Apr. 14, 2015.
Office Action for U.S. Appl. No. 14/620,284 dated Apr. 10, 2015.
Office Action for U.S. Appl. No. 14/626,606 dated Apr. 10, 2015.
Office Action for U.S. Appl. No. 14/626,646 dated Apr. 14, 2015.
File History for U.S. Pat. No. 6,302,230 , U.S. Appl. No. 09/325,978.
File History for U.S. Pat. No. 6,367,817, U.S. Appl. No. 09/635,936.
File History for U.S. Pat. No. 6,581,714, U.S. Appl. No. 09/687,757.
File History for U.S. Pat. No. 6,796,396, U.S. Appl. No. 10/272,480.
File History for U.S. Pat. No. 6,789,640, U.S. Appl. No. 10/308,850.
File History for U.S. Pat. No. 6,827,163, U.S. Appl. No. 10/460,053.
File History for U.S. Pat. No. 6,779,621, U.S. Appl. No. 10/461,720.

(56) References Cited

OTHER PUBLICATIONS

File History for U.S. Pat. No. 7,210,544, U.S. Appl. No. 10/617,598.
File History for U.S. Pat. No. 6,868,931, U.S. Appl. No. 10/669,879.
File History for U.S. Pat. No. 6,553,271, U.S. Appl. No. 09/322,431.
File History for U.S. Pat. No. 7,789,174, U.S. Appl. No. 11/672,743.
Communication pursuant to Article 94(3) EPC issued in EP Appln. No. 05809998.7 dated Sep. 23, 2009.
European Office Action issued in EP Appln. No. 05809998.7 dated Feb. 9, 2015.
Japanese Office Action issued in JP Appln. No. 2007-535917 dated May 23, 2011.
Japanese Office Action issued in JP Appln. No. 2007-535917 dated Feb. 13, 2012.
Japanese Office Action issued in JP Appln. No. 2007-531470 dated Mar. 22, 2011.
Japanese Office Action issued in JP Appln. No. 2007-531470 dated Jun. 12, 2012.
Japanese Office Action issued in JP Appln. No. 2011-197538 dated Mar. 27, 2014.
Japanese Office Action issued in JP Appln. No. 2011-197538 dated Feb. 27, 2015.
Pre-Appeal Examination Report issued in JP Appln. no. 2011-197538 dated Sep. 4, 2015.
Japanese Office Action issued in JP Appln. No. 2014-170130 dated Sep. 30, 2015.
Canadian Office Action issued in CA Appln. No. 2,580632 dated Mar. 16, 2012.
Elnagar, Ashraf, "Prediction of Moving Objects in Dynamic Environments Using Kalman Filters," Proceedings of 2001 IEEE International Symposium on Computational Intelligence in Robotics and Automation, Jul. 29-Aug. 1, 2001.
Grasser et al., "A Mobile, Inverted Pendulum," IEEE Transactions on Industrial Electronics, vol. 49, No. 1, Feb. 2002.
Ha, et al., "Trajectory Tracking Control for Navigation of the Inverse Pendulum Type Self- Contained Mobile Robot" 17 Robotics and Autonomous Systems 60-85 (1996).
Ha, et al. "Trajectory Tracking Control for Navigation of Self-Contained Mobile Inverse Pendulum" Intelligent Robots and Systems '94. 'Advanced Robotic Systems and the Real World', IROS '94. Proceedings of the IEEE/RSJ/GI International Conference on Intelligent Robots and Systems, vol. 3, pp. 1875- 1882, Sep. 12-16, 1994.
Johnson, R.C,. "Unicycles and bifurcations," American J. of Physics, vol. 66, No. 7, 589-92 (1998).
Sheng et al., "Postural Stability of a Human Riding a Unicycle and Its Emulation by a Robot," IEEE Transactions on Robotics and Automation, Oct. 1997.
Sheng, et al., "Realization of a Human Riding a Unicycle by a Robot," Proceedings of the 1995 IEEE International Conference on Robotics and Automation, vol. 2, pp. 1319-1326 (1995).
Tanaka et al., "A Mobile Robot for Service Use: Behaviour Simulation System and Intelligent Control," Proceedings of the 1997 IEEE/RSJ International Conference on Intelligent Robots and Systems, 1997.
Ulyanov et al., "Fuzzy Intelligent Emotion and Instinct Control of a Robotic Unicycle," Proceedings of the 1996 4th International Workshop on Advanced Motion Control, 1996.
Ulyanov et al., "Soft computing for the intelligent robust control of a robotic unicycle with a new physical measure for mechanical controllability," Soft Computing vol. 2, issue 2, pp. 73-88 (1998).
Brown, Jr. et al "A Single-Wheel Gyroscopically Stabilized Robot," IEEE Robotics & Automation Magazine, Sep. 1997.
Lam et al., "Fuzzy Model Reference Control of Wheeled Mobile Robots," The 27th Annual Conference of the IEEE Industrial Electronics Society, 2001.
Liu et al., "Accelerometer for Mobile Robot Positioning," IEEE Transactions on Industry Applications, vol. 37, No. 3, May 2001.
Welch et al., "An Introduction to the Kalman Filter," Department of Computer Science University of North Carolina at Chapel Hill, 2004.
Zenkov, et al., "The Lyapunov-Malkin Theorem and Stabilization of the Unicycle with Rider," Systems and Control Letters, vol. 45, Nos. 4,5, pp. 293-302(10), Apr. 2002.
Zenkov, et al., "Matching and Stabilization of Low-Dimensional Nonholonomic Systems," Proc. CDC, 39, 1289-1295 (2000).
1003624-556174, Updated Joint Claim Construction Chart, In the Matter of Certain Personal Transporters, Components thereof, and Manuals Therefor, ITC investigation # 337-TA-935, Apr. 8, 2015.
1033211-565539, Order # 28, Initial Determination Grating Summary Determination on Violation of Section 337 and Recommended Determination on Remedy and Bonding, In the Matter of Certain Personal Transporters, Components thereof, and Manuals Therefor, ITC investigation # 337-TA-935, Aug. 21, 2015.
1079827-576064, Cease and Desist Order, In the Matter of Certain Personal Transporters, Components thereof, and Manuals Therefor, ITC investigation # 337-TA-935, Mar. 10, 2016.
1079830-576073, Limited Exclusion Order, In the Matter of Certain Personal Transporters, Components thereof, and Manuals Therefor, ITC investigation # 337-TA-935, Mar. 11, 2016.
1079831-576074, General Exclusion Order, In the Matter of Certain Personal Transporters, Components thereof, and Manuals Therefor, ITC investigation # 337-TA-935, Mar. 11, 2016.
1080137-576231, Exclusion Order in Certain Personal Transporters, Components, Thereof and Manuals Therefor, In the Matter of Certain Personal Transporters, Components thereof, and Manuals Therefor, ITC investigation # 337-TA-935, Mar. 14, 2016.
1093315-579120, [International Trade]Commission Opinion, In the Matter of Certain Personal Transporters, components thereof, and Manuals Therefor, ITC investigation # 337-TA-935, Apr. 20, 2016.
996185-553835, Joint Claim Construction Chart, In the Matter of Certain Personal Transporters, Components thereof, and Manuals Therefor, ITC investigation # 337-TA-935, Mar. 24, 2015.
996297-553895, [International Trade] Commission Investigative Staff's Initial Markman Brief, In the Matter of Certain Personal Transporters, Components thereof, and Manuals Therefor, ITC investigation # 337-TA-935, Mar. 25, 2015.
998936-554701, [International Trade] Commission Investigative Staff's Rebuttal Markman Brief, In the Matter of certain Personal Transporters, Components thereof, and Manuals Therefor, ITC investigation # 337-TA-935, Apr. 8, 2015.
553955, Corrected Version of Complainants Segway et al. Initial Markman Brief, including Appendices A-E, In the Matter of Certain Personal Transporters, Components thereof, and Manuals Therefor, ITC investigation # 337-TA-935, Mar. 26, 2015.
553898, Complainants Segway, inc., and DEKA Products Limited Partnership's Initial Markman Brief, including 4ppendices A-E, In the Matter of Certain Personal Transporters, Components thereof, and Manuals Therefor, ITC investigation # 337-TA-935, Mar. 25, 2015.
554773, Complainants Segway, inc., and DEKA Products Limited Partnership's Initial Markman Brief, including Exhibits F-Q, In the Matter of Certain Personal Transporters, Components thereof, and Manuals Therefor, ITC investigation # 337-TA-935, Apr. 8, 2015.
031416, Plaintiffs' Opening Brief in Support of Combined Motion to Strike Defendant's Fifth and Sixth Affirmative Defenses and Motion to Dismiss Defendant's Counterclaims, or, in the Alternative, to Bifurcate and Stay Defendant's Counterclaims and Patent Misuse Defense, Segway Inc., DEKA Products Limited Partnership and *Ninebot (Tianjin) Technology Co., Ltd.* v. *Swagway, LLC*, In the United States District Court for the District of Delaware, C.A. No. 15-1198 (SLR), In the Matter of Certain Personal Transporters, Components thereof, and Manuals Therefor, ITC.
1003624-556174, Updated Joint Claim Construction, In the Matter of Certain Personal Transporters, Components thereof, and Manuals Therefor, ITC investigation # 337-TA-935, Apr. 30, 2015.
Respondent Robstep Robot Co., Ltd.'s Initial Invalidity Contentions and Invalidity Charts A-1 through A-4, B-1 through B-4, C-1 through C-4, In the Matter of Certain Personal Transporters, Components thereof, and Manuals Therefor, ITC investigation # 337-TA-935, Feb. 20, 2015.

(56) References Cited

OTHER PUBLICATIONS

Respondent Robstep Robot Co., Ltd.'s Initial Notice of Prior Art, In the Matter of Certain Personal Transporters, Components thereof, and Manuals Therefor, ITC investigation # 337-TA-935, Feb. 20, 2015.

547826 Respondent Robstep Robot Co., Ltd.'s Response to Amended Complaint, In the Matter of Certain Personal Transporters, Components thereof, and Manuals Therefor, ITC investigation # 337-TA-935, Dec. 12, 2014.

555660 Respondent Shenzhen Inmotion Technologies Co., Ltd.'s Second Notice of Prior Art, In the Matter of Certain Personal Transporters, Components thereof, and Manuals Therefor, ITC investigation # 337-TA-935, Apr. 22, 2015.

855843-543527, Complainants Segway Inc. and DEKA Products Limited Partnership Amended Complaint, In the Matter of Certain Personal Transporters, Components thereof, and Manuals Therefor, ITC investigation # 337-TA-935, Oct. 6, 2014.

975358-547493, Respondent Shenzhen Inmotion Technologies Co., Ltd.'s Response to the Amended Complaint and Notice of Investigation, In the Matter of Certain Personal Transporters, Components thereof, and Manuals Therefor, ITC investigation # 337-TA-935, Dec. 8, 2014.

976632-548144, Respondents Ninebot Inc. et al. Response to the Amended Complaint and Notice of Investigation, including Exhibits A and B, In the Matter of Certain Personal Transporters, Components thereof, and Manuals Therefor, ITC investigation # 337-TA-935, Dec. 19, 2014.

979544-548562 Respondent Roboscooters Response to the Amended Complaint and Notice of Investigation and Exhibit B, In the Matter of Certain Personal Transporters, Components thereof, and Manuals Therefor, ITC Investigation # 337-TA-935, Dec. 13, 2014.

Segway Inc. and DEKA Products Limited Partnership's Responses to Respondent Shenzhen Inmotion Technologies Co., Ltd.'s Second Set of Interrogatories (Nos. 59-61) including Appendices A-1 through A-3, B-1 through B-3, and C, In the Matter of Certain Personal Transporters, Components thereof, and Manuals Therefor, ITC investigation # 337-TA-935, Apr. 23, 2015.

Exhibit B to Respondent Shenzhen Inmotion Technologies Ca, Ltd.'s Response to the Amended Complaint and Notice of Investigation, In the Matter of Certain Personal Transporters, Components thereof, and Manuals Therefor, ITC investigation # 337-TA-935, Dec. 8, 2014 (Note: this should be attached to 975358-547493 which is where the date comes from).

Respondent Shenzhen Inmotion Technologies Co., Ltd., Second Supplemental Objections and Responses to complainants Segway Inc. and DEKA Products Limited Partnership's First Set of Interrogatories (Nos. 1-33) [Nos. 25, 28-30] and First Supplemental Responses to Complainants' Second Set of Interrogatories (Nos. 34-40) (No. 38), In the Matter of Certain Personal Transporters, Components thereof, and Manuals Therefor, ITC investigation # 337-TA-935, May 1, 2015.

Official Action from corresponding Japanese Application No. 2011-1977538 dated Apr. 26, 2016.

* cited by examiner

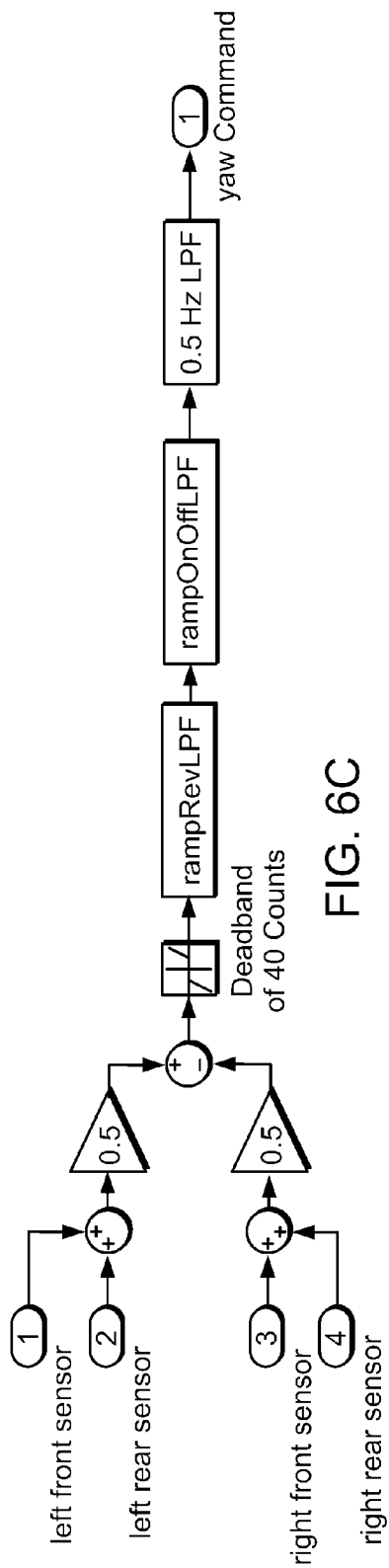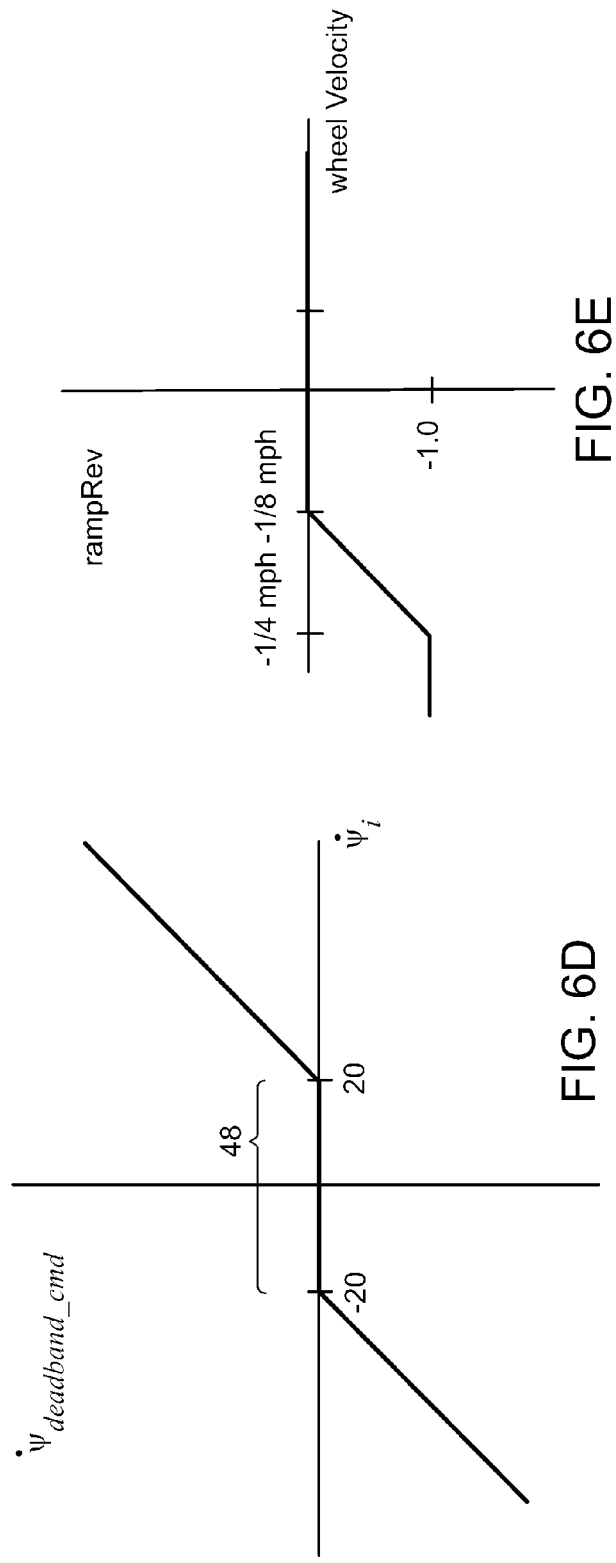

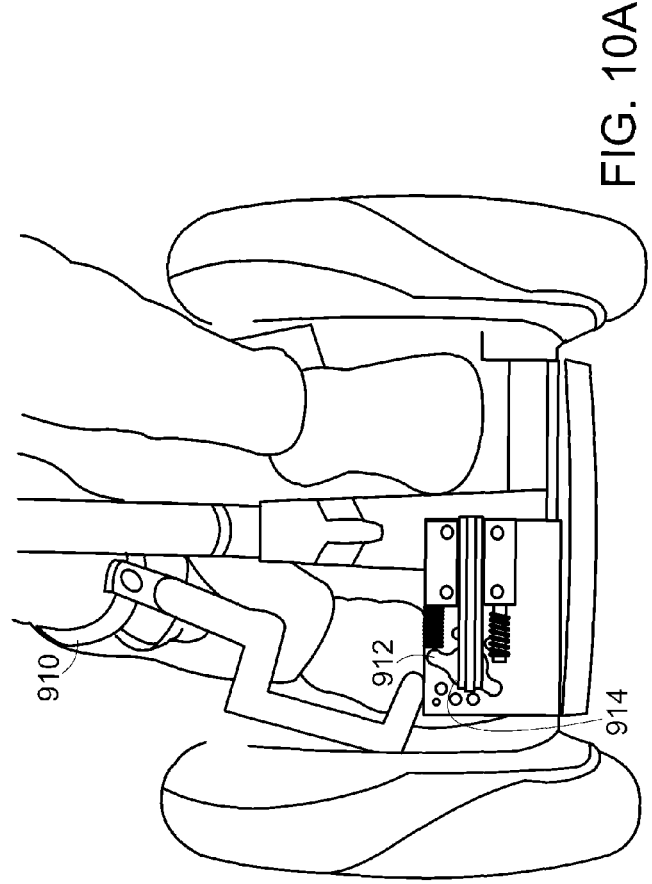
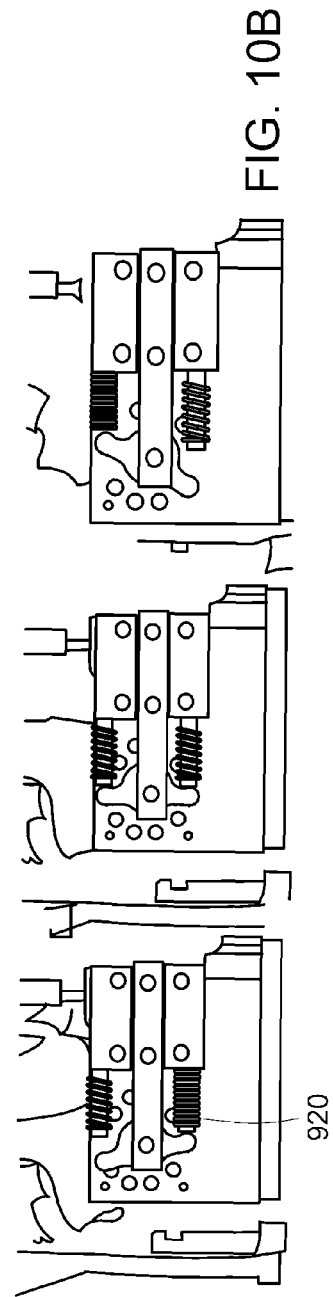

CONTROL OF A PERSONAL TRANSPORTER BASED ON USER POSITION

CROSS-REFERENCE TO RELATED APPLICATIONS

The present application is a continuation of U.S. application Ser. No. 14/446,969, filed Jul. 30, 2014, which is a continuation of U.S. application Ser. No. 13/857,737, filed Apr. 5, 2013, now U.S. Pat. No. 8,830,048, which is a continuation of U.S. application Ser. No. 13/585,041, filed Aug. 14, 2012, now abandoned, which is a continuation of U.S. application Ser. No. 12/879,650, filed Sep. 10, 2010, now U.S. Pat. No. 8,248,222, which is a continuation of U.S. application Ser. No. 11/863,640, filed Sep. 28, 2007, now U.S. Pat. No. 7,812,715, which is a divisional of U.S. application Ser. No. 10/939,955, filed Sep. 13, 2004, now U.S. Pat. No. 7,275,607, which is a continuation-in-part of U.S. application Ser. No. 10/308,850, filed Dec. 3, 2002, now U.S. Pat. No. 6,789,640, which, in turn, claimed priority from U.S. Provisional Application Ser. No. 60/388,846, filed Jun. 14, 2002. U.S. application Ser. No. 10/939,955 is also a continuation-in-part of U.S. application Ser. No. 10/044,590, filed Jan. 11, 2002, now abandoned, which is a divisional of U.S. application Ser. No. 09/635,936, filed Aug. 10, 2000, now U.S. Pat. No. 6,367,817, which is a divisional of U.S. application Ser. No. 09/325,978, filed Jun. 4, 1999, now U.S. Pat. No. 6,302,230. The present application claims priority from all of the foregoing applications by virtue of the priority chain heretofore recited. All of the foregoing applications are incorporated herein by reference in their entirety.

TECHNICAL FIELD

The present invention pertains to control of personal transporters, and more particularly to devices and methods for providing user input with respect to either directional or velocity control of such transporters (having any number of ground-contacting elements) based on the position or orientation of a user.

BACKGROUND OF THE INVENTION

Dynamically stabilized transporters refer to personal transporters having a control system that actively maintains the stability of the transporter while the transporter is operating. The control system maintains the stability of the transporter by continuously sensing the orientation of the transporter, determining the corrective action to maintain stability, and commanding the wheel motors to make the corrective action.

For vehicles that maintain a stable footprint, coupling between steering control, on the one hand, and control of the forward motion of the vehicles is not an issue of concern since, under typical road conditions, stability is maintained by virtue of the wheels being in contact with the ground throughout the course of a turn. In a balancing transporter, however, any torque applied to one or more wheels affects the stability of the transporter. Coupling between steering and balancing control mechanisms is one subject of U.S. Pat. No. 6,789,640, which is incorporated herein by reference. Directional inputs that advantageously provide intuitive and natural integration of human control with the steering requirements of a balancing vehicle are the subject of the present invention.

SUMMARY OF THE INVENTION

In accordance with preferred embodiments of the present invention, a controller is provided that may be employed for providing user input of a desired direction of motion or orientation for a transporter. The controller has an input for receiving specification by a user of a value based on a detected body orientation of the user.

User-specified input may be conveyed by the user using any of a large variety of input modalities, including: ultrasonic body position sensing; foot force sensing; handlebar lean; active handlebar; mechanical sensing of body position; and linear slide directional input.

In those embodiments of the invention wherein the transporter is capable of balanced operation on one or more ground-contacting elements, an input is provided for receiving specification from the user of a desired direction of motion, or a desired velocity value based on a detected body orientation of the user. A processor generates a command signal based at least on the user-specified direction and velocity value in conjunction with a pitch command signal that is based on a pitch error in such a manner as to maintain balance of the transporter in the course of achieving the specified direction and velocity. The input of a desired direction may also include a user-specified yaw value, yaw rate value, or fore/aft direction.

In various other embodiments of the invention, the controller has a summer for differencing an instantaneous yaw value from the user-specified yaw value to generate a yaw error value such that the yaw command signal generated by the processor is based at least in part on the yaw error value. The input for receiving user specification may include a pressure sensor disposed to detect orientation of the user, an ultrasonic sensor disposed to detect orientation of the user, or a force sensor disposed on a platform supporting the user for detecting weight distribution of the user. In yet other embodiments, the input for receiving user specification includes a shaft disposed in a plane transverse to an axis characterizing rotation of the two laterally disposed wheels, the desired direction and velocity specified on the basis of orientation of the shaft.

In accordance with further embodiments of the invention, the balancing transporter may includes a handlebar, and the controller may further have a powered pivot for positioning the handlebar based at least upon one of lateral acceleration and roll angle of the transporter. In particular, the controller may have a position loop for commanding a handlebar position substantially proportional to the difference in the square of the velocity of a first wheel and the square of the velocity of a second wheel.

In accordance with yet other embodiments of the invention, an apparatus is provided for prompting a rider to be positioned on a vehicle in such a manner as to reduce lateral instability due to lateral acceleration of the vehicle. The apparatus has an input for receiving specification by the rider of a desired direction of travel and an indicating means for reflecting to the rider a desired instantaneous body orientation based at least on current lateral acceleration of the vehicle. The indicating means may include a handlebar pivotable with respect to the vehicle, the handlebar driven in response to vehicle turning.

BRIEF DESCRIPTION OF THE DRAWINGS

The foregoing features of the invention will be more readily understood by reference to the following detailed description, taken with reference to the accompanying drawings, in which:

FIG. 6C is a schematic depicting the development of a yaw command signal from the foot-force sensors of FIG. 6A, in accordance with an embodiment of the present invention;

FIG. 6D shows a deadband in the command as a function of yaw input;

FIG. 6E shows a ramp function for switching yaw command in reverse as a function of wheel velocity;

FIG. 10A shows a front view of a knee position sensor for providing steering input to a personal transporter in accordance with embodiments of the present invention;

FIG. 10B shows a centering mechanism employed in conjunction with the knee position sensor of FIG. 10A;

DETAILED DESCRIPTION OF SPECIFIC EMBODIMENTS

A personal transporter may be said to act as 'balancing' if it is capable of operation on one or more wheels but would be unable to stand on the wheels but for operation of a control loop governing operation of the wheels. A balancing personal transporter lacks static stability but is dynamically balanced. The wheels, or other ground-contacting elements, that provide contact between such a personal transporter and the ground or other underlying surface, and minimally support the transporter with respect to tipping during routine operation, are referred to herein as 'primary ground-contacting elements.'

Figure 1:
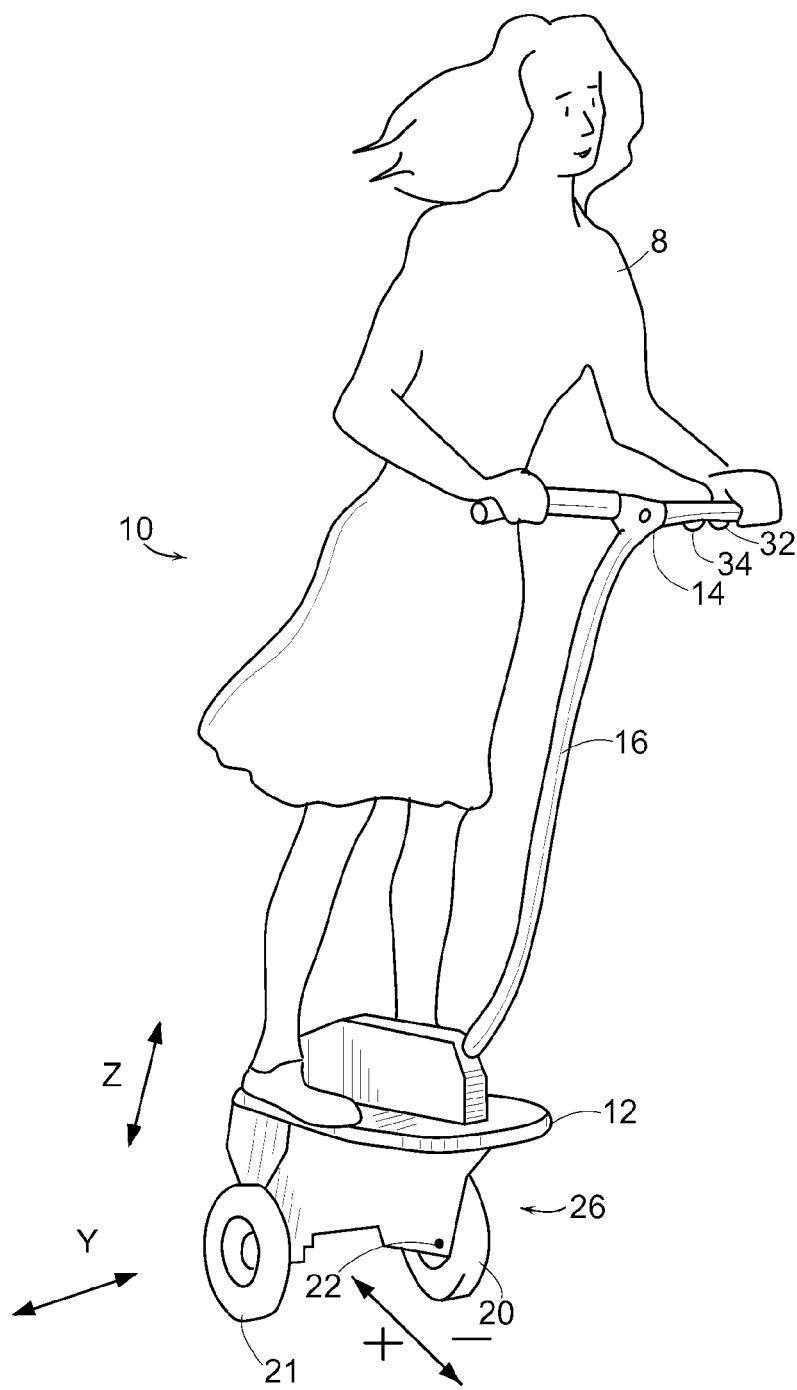
FIG. 1 shows a personal transporter, as described in detail in U.S. Pat. No. 6,302,230, to which the present invention may advantageously be applied.

FIG. 1 shows a balancing personal transporter, designated generally by numeral 10, and described in detail in U.S. Pat. No. 6,302,230, as an example of a device to which the present invention may advantageously be applied. A subject 8 stands on a support platform 12 and holds a grip 14 on a handle 16 attached to the platform 12. A control loop may be provided so that leaning of the subject results in the application of torque to wheel 20 about axle 22 by means of a motor drive depicted schematically in FIG. 2, as discussed below, thereby causing an acceleration of the transporter. Transporter 10, however, is statically unstable, and, absent operation of the control loop to maintain dynamic stability, transporter 10 will no longer be able to operate in its typical operating orientation. "Stability" as used in this description and in any appended claims refers to the mechanical condition of an operating position with respect to which the system will naturally return if the system is perturbed away from the operating position in any respect.

Different numbers of wheels or other ground-contacting members may advantageously be used in various embodiments of the invention as particularly suited to varying applications. Thus, within the scope of the present invention, the number of ground-contacting members may be any number equal to, or greater than, one. A personal transporter may be said to act as 'balancing' if it is capable of operation on one or more wheels (or other ground-contacting elements) but would be unable to stand stably on the wheels but for operation of a control loop governing operation of the wheels. The wheels, or other ground-contacting elements, that provide contact between such a personal transporter and the ground or other underlying surface, and minimally support the transporter with respect to tipping during routine operation, may be referred to herein as 'primary ground-contacting elements.' A transporter such as transporter 10 may advantageously be used as a mobile work platform or a recreational vehicle such as a golf cart, or as a delivery vehicle.

The term "lean", as used herein, refers to the angle with respect to the local vertical direction of a line that passes through the center of mass of the system and the center of rotation of a ground-contacting element supporting the system above the ground at a given moment. The term "system" refers to all mass caused to move due to motion of the ground-contacting elements with respect to the surface over which the vehicle is moving.

"Stability" as used in this description and in any appended claims refers to the mechanical condition of an operating position with respect to which the system will naturally return if the system is perturbed away from the operating position in any respect.

One mechanism for providing user input for a yaw control system of a personal transporter is described in detail in U.S. Pat. No. 6,789,640. As described therein and as shown in FIGS. 3A-3C, a user mounted on the transporter may provide yaw control input to a yaw controller 502 (shown in FIG. 2) by rotating yaw grip assembly 800, shown in detail in FIG. 3B.

Figure 2:
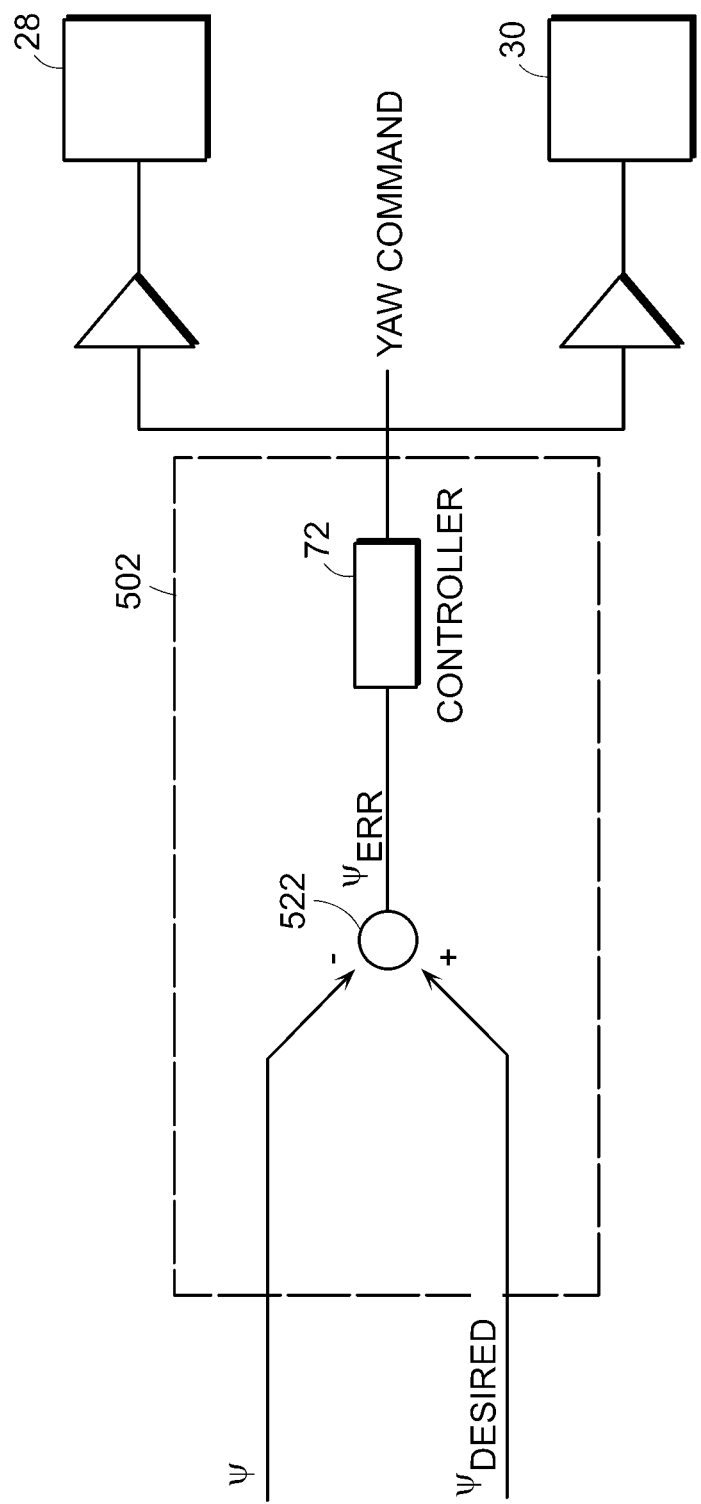
FIG. 2 shows a block diagram showing the constitutive inputs and outputs of a yaw command in a system architecture to which the present invention may be advantageously applied.

FIG. 2 depicts the differencing, in summer 522, of the current yaw value $\psi$ with respect to the desired yaw value $\psi_{desired}$ to obtain the current yaw error $\psi_{err}$. Desired yaw value $\psi_{desired}$ is obtained from a user input, various embodiments of which are described herein. The current value $\psi$ of yaw is derived from various state estimates, such as the differential wheel velocities, inertial sensing, etc. Derivation of the yaw command from the yaw error is provided by motor controller 72 according to various processing algorithms described, for example, in U.S. Pat. No. 6,288,505, and applied to left and right motors 28 and 30, respectively.

Figures 3A, 3B, 3C:
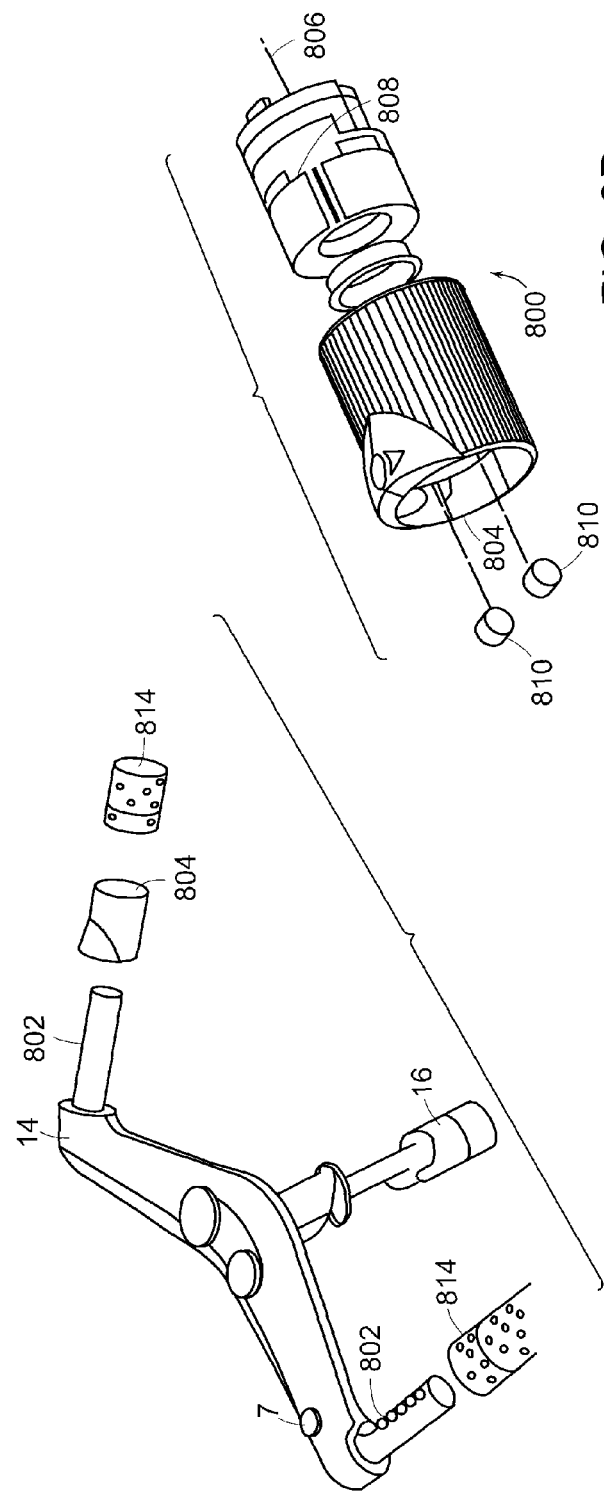
FIG. 3A is an exploded view of components of a yaw control mechanism showing a yaw control grip coupled to a user interface of a personal transporter, in accordance with an embodiment of the present invention.
FIG. 3B shows a detailed exploded view of the yaw control grip of FIG. 3A.
FIG. 3C shows the integral yaw control sensor of the yaw control mechanism of FIG. 3A.

With particular reference to FIG. 3A, one embodiment of user interface 14 has twin hollow stalks 802, one on either side, either of which may serve interchangeably to support yaw grip assembly 800. Thus yaw may advantageously be controlled by a specified hand (right or left), either side of central control shaft 16. Yaw grip assembly 800 comprises a grip 804 which is rotated about an axis 806 coaxial with stalks 802. Spring damper 808 provides an opposing force to rotation of yaw grip 804 and returns yaw grip 804 to the central neutral position. Yaw grip 804 contains at least one magnet 810 (two are shown in FIG. 3B, in accordance with a preferred embodiment), the rotation of which about axis 806 allows the rotational orientation of grip 804 to be sensed by sensor unit 812 (shown in FIG. 3C) which is disposed within protruding stalk 802. Thus, user interface 14 may be sealed at its ends with fixed yaw grips 814 and the integral sealed nature of the user interface is not compromised by the yaw control input. Sensor unit 812 may contain Hall effect sensors which are preferably redundant to ensure fail-safe operation. Other magnetic sensors may also be employed within the scope of the present invention.

Figure 4:
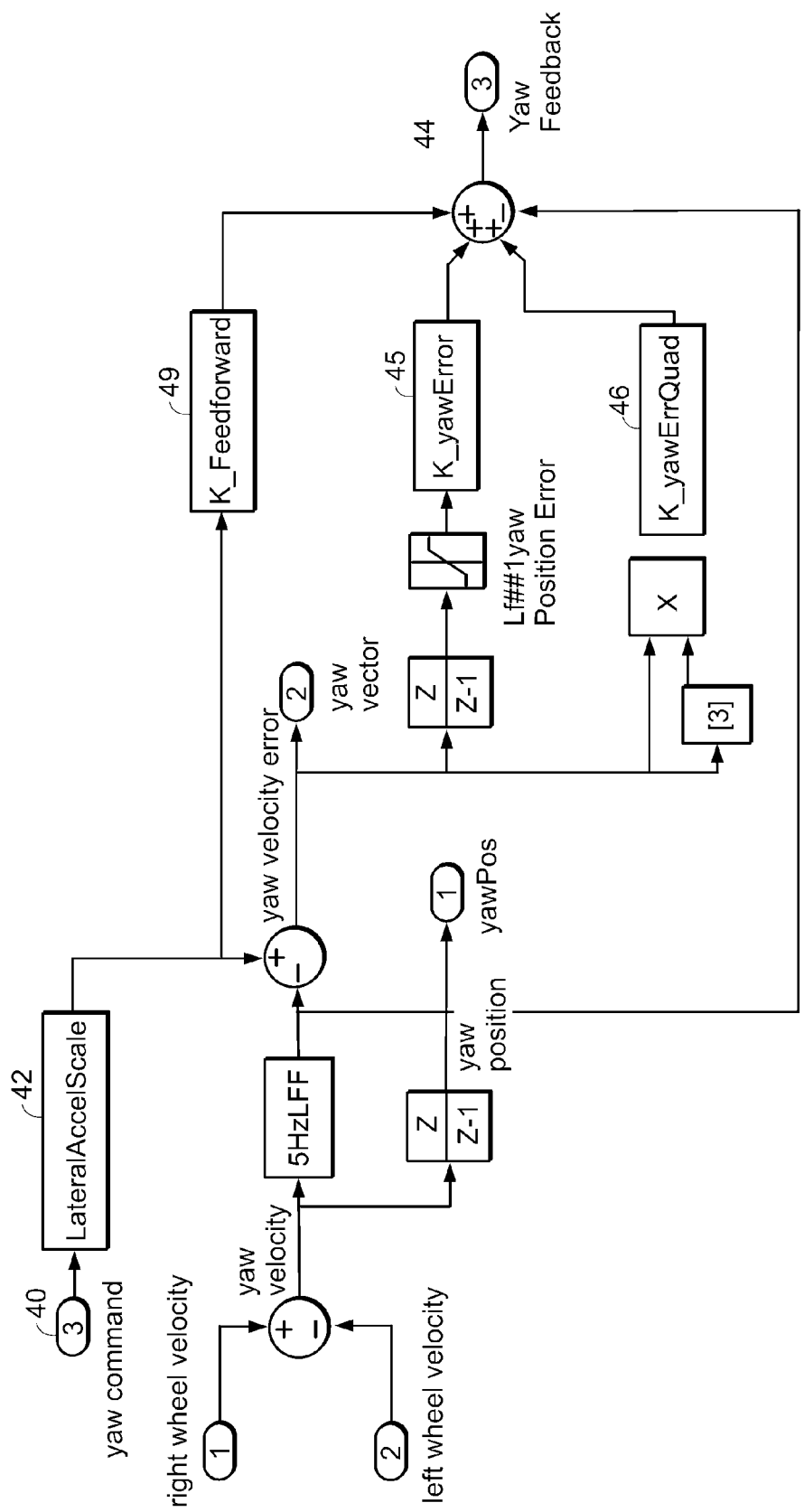
FIG. 4 shows a schematic block diagram of a yaw-feedback control system in accordance with embodiments of the present invention.

FIG. 4 shows a block diagram for the yaw feedback control system, in accordance with one embodiment of the invention. The LateralAccelScale function 42 reduces the effect of the yaw input 40 at higher wheel speeds and at higher centripetal acceleration. Feedback 44, used to regulate the commanded yaw velocity, contains a yaw position term 45 to maintain yaw position, a velocity squared term 46 that will attempt to regulate the yaw velocity to zero, and a feedforward term 49 used to provide better yaw command response to the user.

From FIG. 4, it is apparent that the feedforward term 49 must dominate for rapid maneuvers in order to provide a responsive system. The velocity-squared feedback 46 deviates from linear control theory and has the effect of providing nonlinear yaw velocity damping.

Several alternatives to a twist grip input device for specifying user directional or velocity input are now described.

Body Position Sensing

Figure 5A:
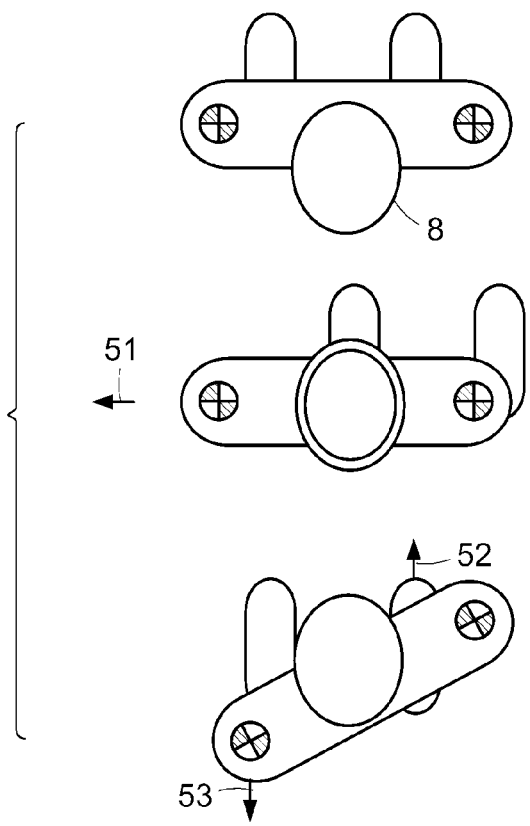
FIG. 5A is a schematic top view of a rider in positions indicating full square positioning, a tilt to the left, and a counterclockwise rotation, respectively.

In accordance with various embodiments of the present invention, a device which detects the body position of the rider is employed to control fore/aft motion or steering of a transporter. For purposes of yaw control, in accordance with various embodiments of the invention, sensors detect whether the hips or shoulders of a rider, shown schematically from above in FIG. 5A, are squarely aligned, or are translated in a lateral direction 51 or else rotated, such that one shoulder is thrust in a forward direction 52 while the opposing shoulder is thrust in a backward direction 53. These schemes can be used independently or to provide directional input.

Any method of sensing of body position to control vehicle yaw or fore/aft motion is within the scope of the present invention and of any appended claims. One embodiment of the invention, described with reference to FIG. 5B, entails mechanical contact with the rider 8. Pads 54 are mounted on yoke 55 and contain pressure transducers that transmit signals to the yaw controller based on changes in sensed position of the hips of the user. Other methods of sensing user position may rely upon optical or ultrasonic detection, an example of which is now described with reference to FIGS. 5C and 5D.

In one embodiment, an ultrasonic beacon is worn by the rider, and an array of receivers mounted to the machine detect the position of the rider. Time of flight information is obtained from transmitter to each receiver and used to calculate the lateral position of the user with respect to the center of the machine. To turn the machine to the right, the user leans to the right, and similarly for turning left. In addition to the intuitive appeal of a mechanism which translates body motion to transporter control, as in the case of fore-aft motion control of a personal transporter of the sort described in U.S. Pat. No. 6,302,230, the body-control modality also advantageously positions the user's center of gravity (CG) correctly for high speed turns.

Figure 5B:
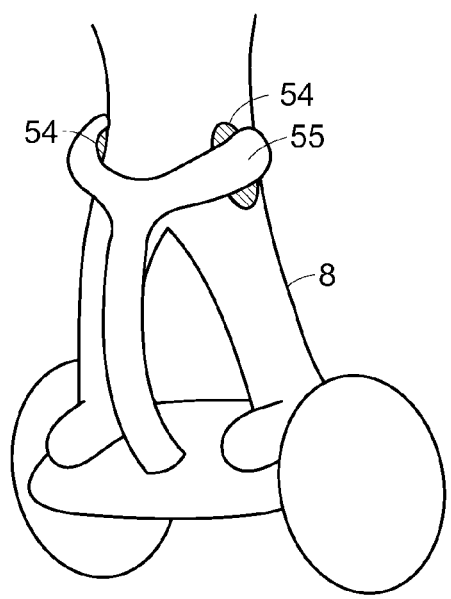
FIG. 5B is a front view of a hip collar for detecting changes in rider orientation to control yaw in accordance with an embodiment of the present invention.
Figure 5C:
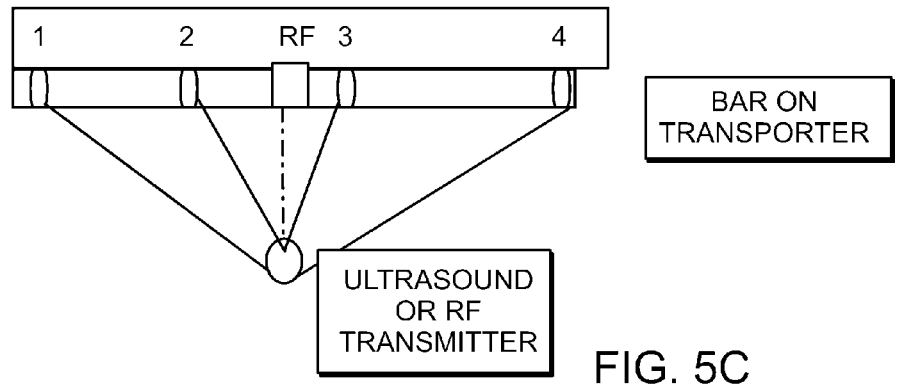
FIG. 5C is a diagram of an ultrasound transmitter/receiver configuration in accordance with various embodiments of the present invention.

A body lean system described with reference to FIGS. 5A and 5B consists of three distinct mechanical components—the transmitter beacon, the receiver array, and the processing electronics. In one embodiment of the invention, an ultrasonic (US)/RF transmitter beacon is worn by the rider, and an array of ultrasonic receivers and an RF receiver is mounted below the handlebars of the transporter, along with interface electronics. Various ultrasonic transmitters/receivers may be employed, such as those supplied by Devantech Ltd. of Norfolk, England. The transmitter beacon is a small piece of Delrin® acetal resin with three ultrasound transmitters, at a typical frequency of 40 kHz, mounted at 90 and ±45 degrees. This produces a cone of sound of about 160 degrees. The driver electronics are mounted on a printed circuit board buried behind the transmitters, and a small RF transmitter is mounted below. A belt clip from a wireless phone attaches the transmitter to the user, while power is supplied by batteries.

The receiver array is a bar with receivers mounted at various locations. The ultrasound receivers are also mounted in small pieces of Delrin®, with the electronics located behind the bar at each location. To increase the size of the reception cone, 2 US receivers are used at each location, one mounted facing straight out and the other at 45 degrees to that. For the outboard sensors, the 45-degree receiver faced inward and for the inboard receivers, the 45 degree receiver faced outwards. This makes it possible to use the two outboard receivers (left and right) for location when the rider is at the center of the machine, but as the rider moves right, the two right sensors take over, and the same when the rider moves to the left.

An ultrasonic rangefinder, such as a Devantech Model SRF-04, may provide both the transmitter and receiver functions and circuitry, however modifications are within the scope of the present invention. The beacon portion consolidates three drivers onto a single board. In addition, the microcontroller code residing on the transmitter boards allows the board to transmit continuously.

The board designed to interface to the computer was breadboarded with microcontrollers of the same type as the Devantech boards. The function of this board is to create a square wave that represents the time difference of arrival between the RF pulse and the ultrasonic pulse (wave goes high when the RF pulse arrives, and low when the US pulse arrives), and correctly interface this wave to the computer circuitry. Since RF travels at the speed of light, and sound at the speed of sound, this scheme results in an accurate ultrasonic time of flight (TOF) signal.

Figure 5D:
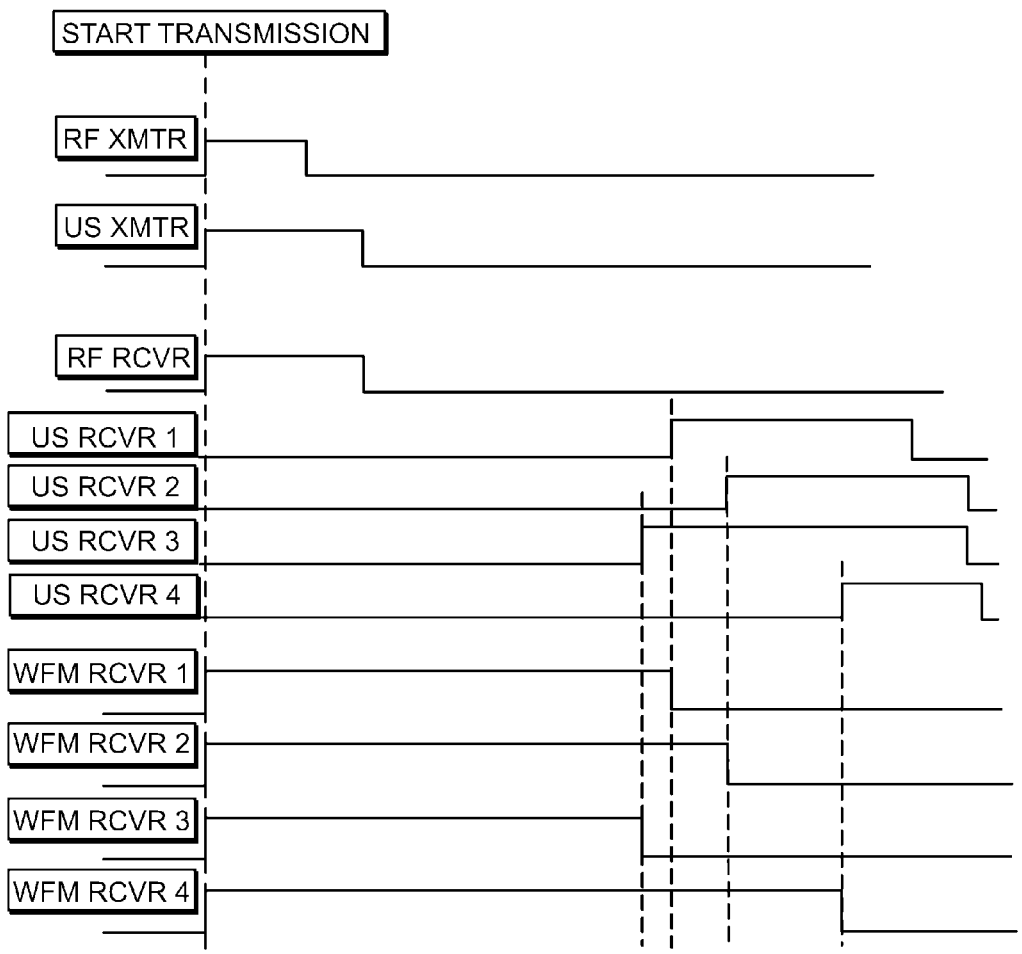
FIG. 5D is a waveform timing display of ultrasound signals transmitted and received by components of embodiments of the present invention depicted in FIG. 4A.

With reference to FIG. 5D, the counter timer board residing in the computer chassis receives 4 waveforms representing the 4 TOF's from the transmitter to the 4 receivers, and using a 400 KHz clock, determines the duration of each pulse (in counts of the 400 khz clock). This info is then passed to the algorithms for distance calculation and additional processing.

When a balancing transporter is traveling at any significant speed, the rider needs to lean into a commanded turn in order to counteract the centripetal accelerations due to the turn. This machine uses the body location sensors to turn the machine. When the rider is centered on the machine, no turn input is generated. When the rider leans to the left, a left turn is commanded, and the same for the right. Thus the turn is not initiated until the users CG is properly located. In addition, by knowing the users exact CG location (as by positioning the transmitter at the waist of the rider), the system is able to exactly match the wheel speed/turn rate to the angle the user is at, theoretically exactly canceling out the forces acting on the body. Thus the amount of turn is tuned for the CG location of the rider and wheel speed.

In accordance with the invention, time-of flight (TOF) information from an ultrasonic transmitter is transmitted to at least 2 ultrasonic receivers. Time of flight was calculated from the difference of a RF received pulse edge to a US received pulse edge. Since the speed of sound is substantially a constant (within the operation of the machine), distance can be calculated from its time of flight from transmitter to receiver. The law of cosines along with the known distances of the receivers from center and from each other is then used to calculate the location of the transmitter in the lateral direction. Because of the redundant receivers, the lateral location is unique, and immune to changes in height and fore/aft distance from the bar (unless this change resulted in a loss of line-of sight (LOS).

Feet Force

In accordance with another embodiment of the invention, yaw control input is provided to a transporter by sensing the rider's weight distribution by using force sensors on the foot plate. In order to steer, the rider leans in the direction of desired turn. Lean, right: turn right; lean left: turn left. Many variations can be derived from a base system containing many force sensors located at the foot plate.

A PCB board provides all signal conditioning for the force sensors. The sensor signals are output from the PCB board as zero to five volt analog signals. Spare A/D inputs on the amplifiers are used to read in the 8 analog signals and provide an 8-bit count to the software for each sensor.

The primary variation implemented and tested uses sensors on the left and sensors on the right sides of the foot plate. When the person leans to the right, the right sensor signals become large, indicating a turn to the right. When the person leans to the left, the left sensor signals become large, indicating a turn to the left. A special foot plate was constructed to allow force distribution to be measured at four corners of a rigid plate.

The resulting system is advantageously very maneuverable at low speeds and a rider may became more proficient at this yaw input than the twist grip yaw input. There is a tradeoff between the bandwidth of the device that enables the system handle disturbances better, and the perceived responsiveness of the system.

As a natural movement, when turning on a personal transporter, a user tends to shift weight in the direction of the turn. The reason for this is the centripetal force generated by turning tends to push the person off the transporter. The same user movement is required when riding a 3-wheel or a 4-wheel all-terrain-vehicle (ATV). As a result, a natural input to turn that encourages good user position is to turn right when the user shifts their weight to the right. In this configuration, the user is in the ideal position to make a right turn.

Skiers and skaters tend to push off with their right foot to turn left. The reason for this is they shift their weight distribution from the right to the left by using their feet. On a personal transporter in accordance with the present invention, users needs to shift their weight from right to left not using their feet, but using the handlebars for this input device. If the sign were reversed to accommodate the skiers and skaters' preference to lean right and turn left, an unstable system would result. As the user leans right, the transporter turns left, generating a centripetal force that pushes the user more to right, generating more left turn command.

Figure 6A:
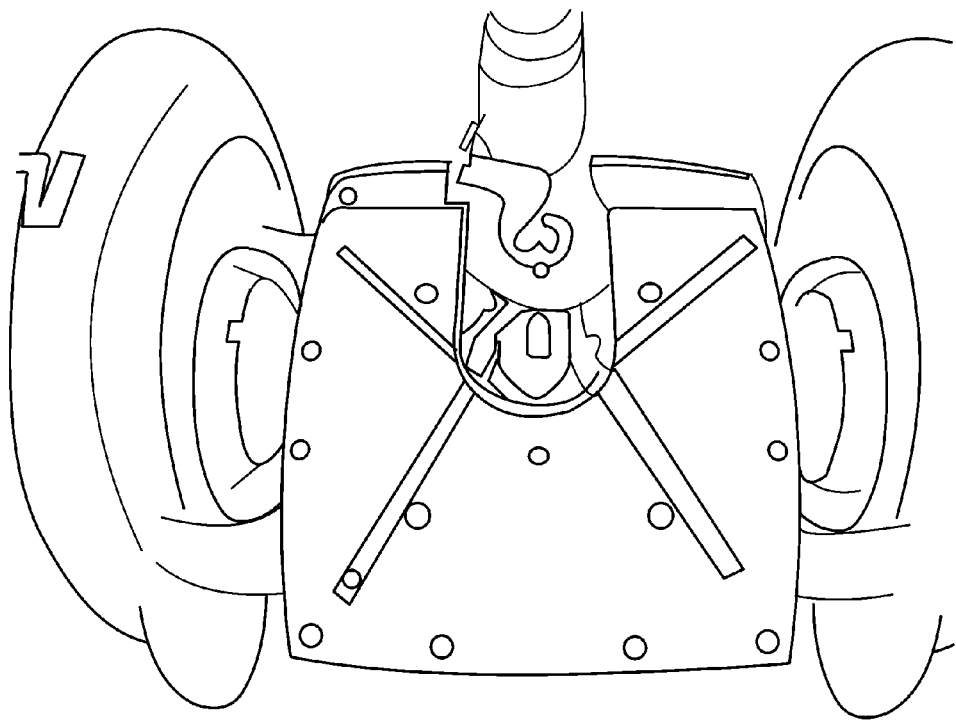
FIG. 6A is a top view of the platform of a personal transporter with the pressure plate removed, indicating the placement of feet-force pressure sensors in accordance with various embodiments of the present invention.

Referring to FIG. 6A, the force sensing element is located at the end of the flexible ribbon in a circle about the size of a dime. With no force on the sensor, the resistance is around 800 Mohms. With 100 lbs on the sensor, the output is around 200 Mohms. To condition the signal, op-amps were used to create an active amplifier and an active anti-aliasing filter. The goal of the amplifier is to generate an output that is proportional to the change in resistance. The goal of the filter is to prevent measurements above 50 Hz from being measured. An inverting amplifier is used since it provides an output proportional to the change in resistance. An inverting lowpass filter is used as an anti-aliasing filter and to change the voltage back to 0 to 5 volts. A +/−12 Volt supply is used to power the op-amps to remain within the linear safe regions of the op-amps.

Figure 6B:
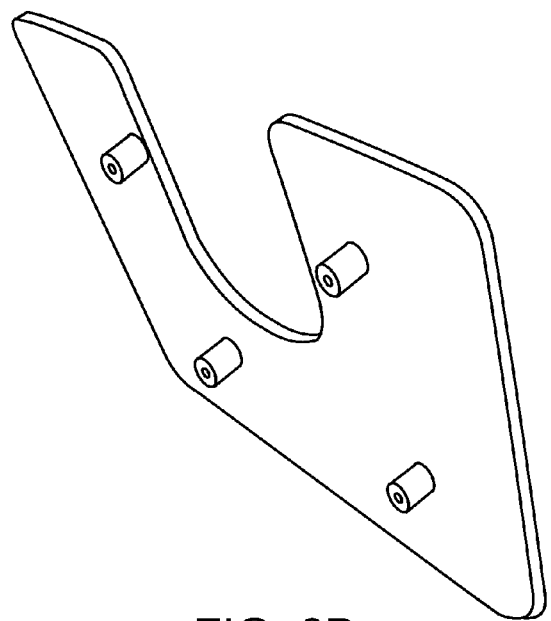
FIG. 6B is a diagram of a pressure plate for application of force by a user in embodiments of the present invention depicted in FIG. 6A.

The sensors are located under a metal foot-plate, one in each corner, as shown in FIG. 6A. A metal plate on top allows the standard rider-detect buttons to be pressed while providing a hard surface to press against each of the 4 sensors. The metal plate is shown in FIG. 6B.

The overall yaw command from the sensor measurements to the yaw command delivered to the control system is shown in FIG. 6C.

Since a user often shifts his weight slightly while standing in place, a deadband is added to the sensor processing. As shown in FIG. 6D, deadband 48 provides a region around zero yaw input where slight yaw inputs result in no yaw command.

To calculate the yaw command from the sensors, the following equation is used:

$$\dot{\psi}_{cmd} = \frac{(\text{right front} + \text{right rear})}{2} - \frac{(\text{left front} + \text{left rear})}{2},$$

where $\dot{\psi}_{cmd}$ is the commanded rate of change in yaw.

Each sensor provides 0 Volts, or 0 counts with no weight on it, and 5 Volts, or 255 counts fully loaded. A deadband of around 40 counts provided smooth enough control with enough room to feel comfortable. Additionally, filters may be employed to filter the command signal, with passbands typically centered from about 0.5 Hz to about 3 Hz.

When moving in reverse, if the same equations are used to generate the yaw command, the resulting system has positive feedback. When the transporter performs an "S-turn", in reverse, if the user leans to the right, the transporter will turn to the left and create a centripetal force on the user, pushing the user to the right. To solve this issue, a "C-turn" may be implemented. A ramp function is used to reverse the yaw command when the transporter begins moving in reverse. To keep a consistent turning motion, when turning in place, the ramp only switches the direction of the yaw command when it moves in reverse. FIG. 6E shows the ramp function for switching yaw command in reverse as a function of wheel velocity. The rampRev function is used to modify the yaw velocity command as follows:

$$\dot{\psi}_{cmd} = \dot{\psi}_{cmd} + 2 \cdot \text{rampRevLPF} \cdot \dot{\psi}_{cmd}$$

The rampRev signal is lowpass filtered at 5.0 Hz to smooth the effects of the ramp.

A brake switch, such as brake switch 7 (shown in FIG. 3A) may be connected to turn the yaw command off when it is pressed. When the button is pressed, a yaw command multiplier of 0 is applied, whereas, if it is released, the yaw command multiplier is 1. A 0.5 Hz Low Pass Filter is used to smooth the transitions between on and off.

Handlebar Lean

One of the key properties of a good directional input device is its ability to provide directional input while managing lateral acceleration. High lateral acceleration turns require the user to lean into the turn to keep from falling off or tipping over the transporter. An optimal directional input device will require the user to have their body properly positioned when commanding a directional input. A twist grip yaw input, such as discussed above with reference to FIG. 3, encourages proper body positioning through the orientation of its rotation axis and the design of the knob and handle combination. It is possible, however, to make an uncoordinated input depending on the driver's technique Another method of encouraging proper body positioning is to make one or more handlebars into a joystick. By pivoting the bar near the base of the machine, the user can move his or her body at high speeds and merely hold onto the handlebar and command an input. When properly tuned, the user's body is already in position to react against the lateral acceleration at the initiation of the turn, reducing the likelihood of an improperly coordinated turn.

In the handlebar lean machine, the yaw input is proportional to the handlebar angle with respect to the chassis. Preferably, the pivot axis is mounted as low as practical on the transporter ground-contacting module in order to allow the bar motion to follow the users body motion naturally, since a person leans most stably by pivoting at the ankles. In other words, a low pivot handlebar tracks the body kinematics. In this embodiment, the yaw input is converted into a yaw command using standard personal transporter algorithms, which apply a fixed gain to yaw input at low speeds, but scale the gain at higher speed to make the yaw input correspond to lateral acceleration instead of yaw rate. This works well with the handlebar lean device, since the desired lean angle is roughly proportional to lateral acceleration. The result is a very natural input method, where the user "thinks" right or left via leaning, and the machine follows.

$$\dot{\psi}_{cmd} = K(\phi_{HB} - \phi_{Roll})$$

a. where K is a constant;
$\phi_{HB}$ is the handlebar angle with respect to the platform;
$\phi_{Roll}$ is the platform lean with respect to gravity
$\dot{\psi}_{cmd}$ is the yaw command.

Other embodiments of the invention may have an inclined or horizontally mounted pivot handlebar. In machines with inclined pivots, the angle of the pivot with respect to the contact patch and surface provided interesting turning dynamics. Specifically, the axis of rotation may affect the dynamics of turning on a slope or on a flat surface. Preferably, the machine has a low horizontal pivot. A horizontal pivot can easily track the kinematics of the body during a turn.

In accordance with yet other embodiment of the invention, with the direction of travel as the reference point, the pivoted handlebar may be either mounted in the front or the rear of the transporter. The configuration of a rear mounted pivot handlebar enables a user to steer the transporter with other parts of the body such as the knees, in addition to using a limb coupled to the handlebar. Furthermore, the transporter may include a feature that disables the lean steer when a user is mounting or dismounting. The feature may be activated when the transporter determines that a user is partially on/off the platform such that the transporter may not turn into or away from the user while mounting or dismounting.

Figure 7A:
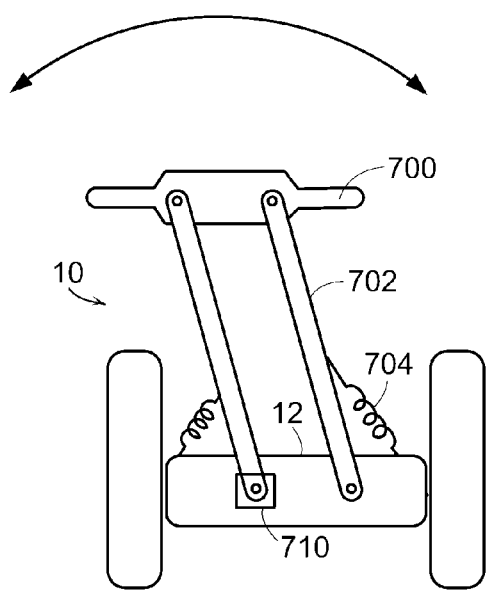
FIG. 7A shows a handlebar lean device for control input to a personal transporter in accordance with embodiments of the present invention.
Figure 7B:
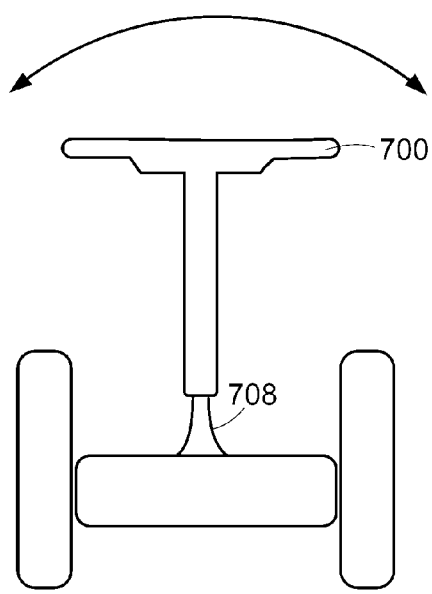
FIG. 7B shows a handlebar lean device with flexure coupling of the control stalk to the ground-contacting module for control input to a personal transporter in accordance with embodiments of the present invention.

Of the various mechanisms suited to provide for handlebar lean, a first is described with reference to FIG. 7A. Motion of handlebar 700 is constrained to a plane that is substantially transverse to the direction of forward motion of personal transporter 10 by means of parallel link bars 702 that are pivotally coupled both to platform 12 and to handlebar 700. Motion of the handlebar may also be biased to a central position and/or damped by means of springs 704 or shock absorbers. In an alternate embodiment shown in FIG. 7B, handlebar 700 may be coupled to platform 12 of the transporter 10 by flexure elements 708, again constraining motion of the handlebar substantially to a plane transverse to the direction of forward motion and allowing tilting of the handlebar in an arc centered upon a virtual pivot at, or near, the plane of platform 12. In either of the embodiments of FIGS. 7A and 7B, one or more sensors 710 detect the position of handlebar 700 or of members 702 coupling the handlebar to the rest of the transporter, either with respect to the vertical or with respect to a direction fixed with respect to the ground-contacting module. Sensor 710 may be a load cell, for example, disposed along control shaft 16. Furthermore, the springs or shock absorbers coupled to the handlebar may be used to limit the turning rate of the transporter if desired.

Preferably, the motion of the handlebar is not biased to a central position. In embodiments where the handlebar is not biased to a central position, there is no preloading around the center and thus a user can precisely and accurately steer the transporter.

Figure 7C:
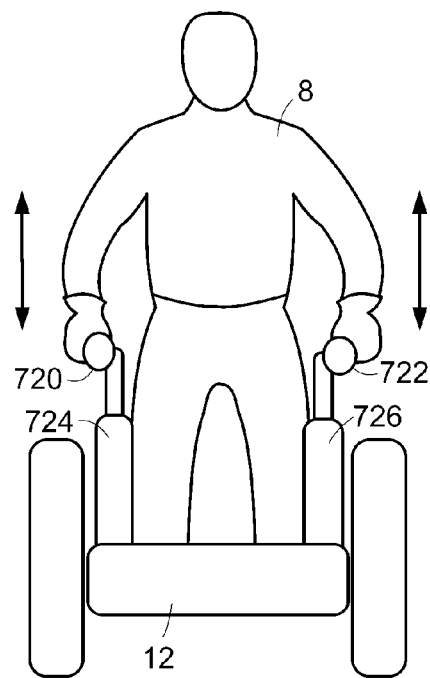
FIG. 7C shows a further handlebar lean device with separated handles for control input to a personal transporter in accordance with embodiments of the present invention.

In accordance with an embodiment depicted in FIG. 7C, two separate handlebar segments 720 and 722 may be moved separately, by leaning of the user 8, relative to platform 12 of the transporter. In the embodiment shown, the position of each handlebar segment is biased to a specified 'neutral' height within respective sleeves 724 and 726 by means of springs, or otherwise. A relative height offset is transmitted to the yaw controller to control turning, as described in connection with other user input modalities.

Figure 7D:
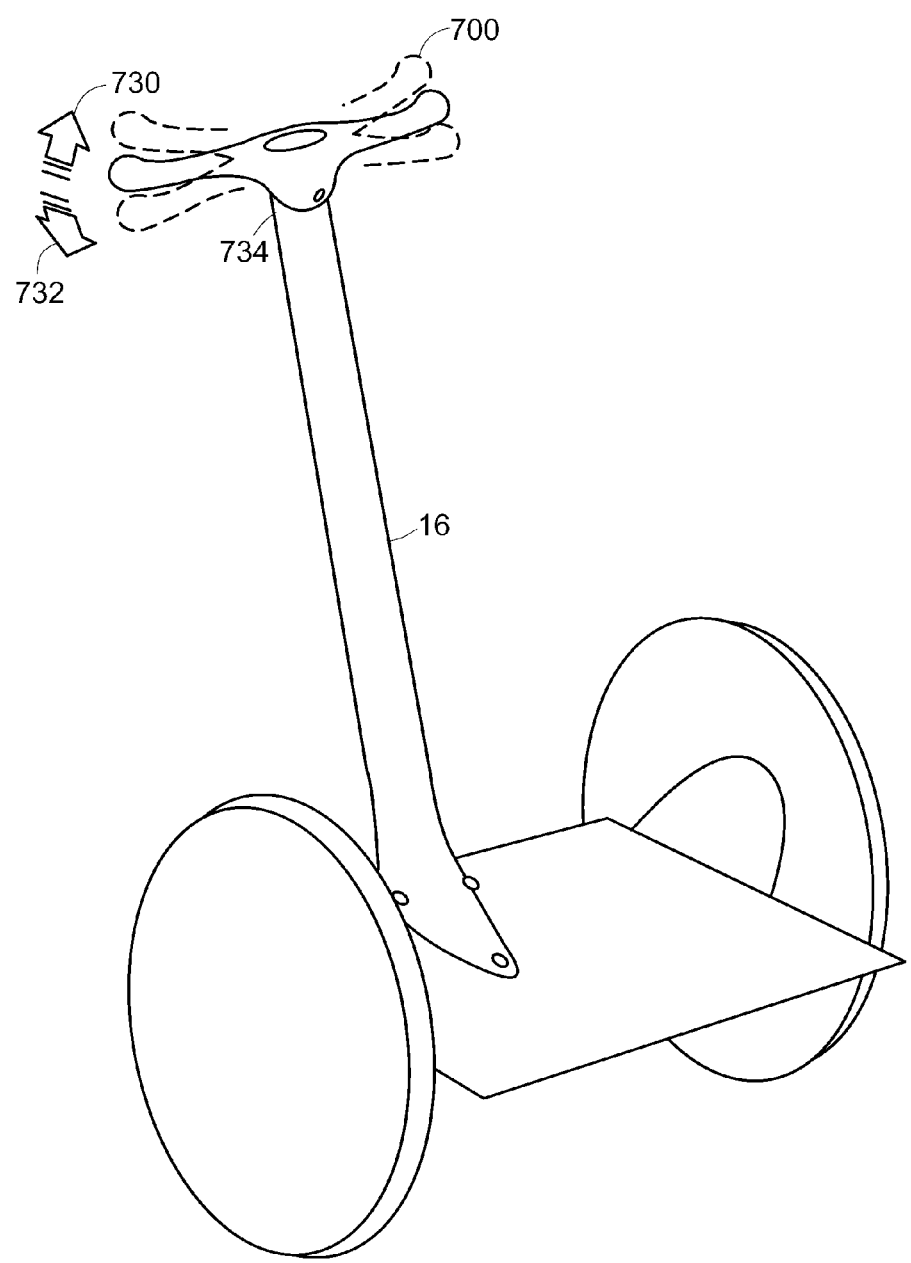
FIG. 7D shows a rotating handlebar device for control input to a personal transporter in accordance with embodiments of the present invention

Yet a further embodiment of the invention is depicted in FIG. 7D, where rotation in clockwise and counterclockwise directions 730 and 732 of handlebar 700 relative to support stalk 16 is sensed to generate a signal that transmits a user input to yaw controller 502 (shown in FIG. 2). A shock absorber 734 is preferably built in to the pivotal coupling of handlebar 700 about shaft 16.

Figure 7E:
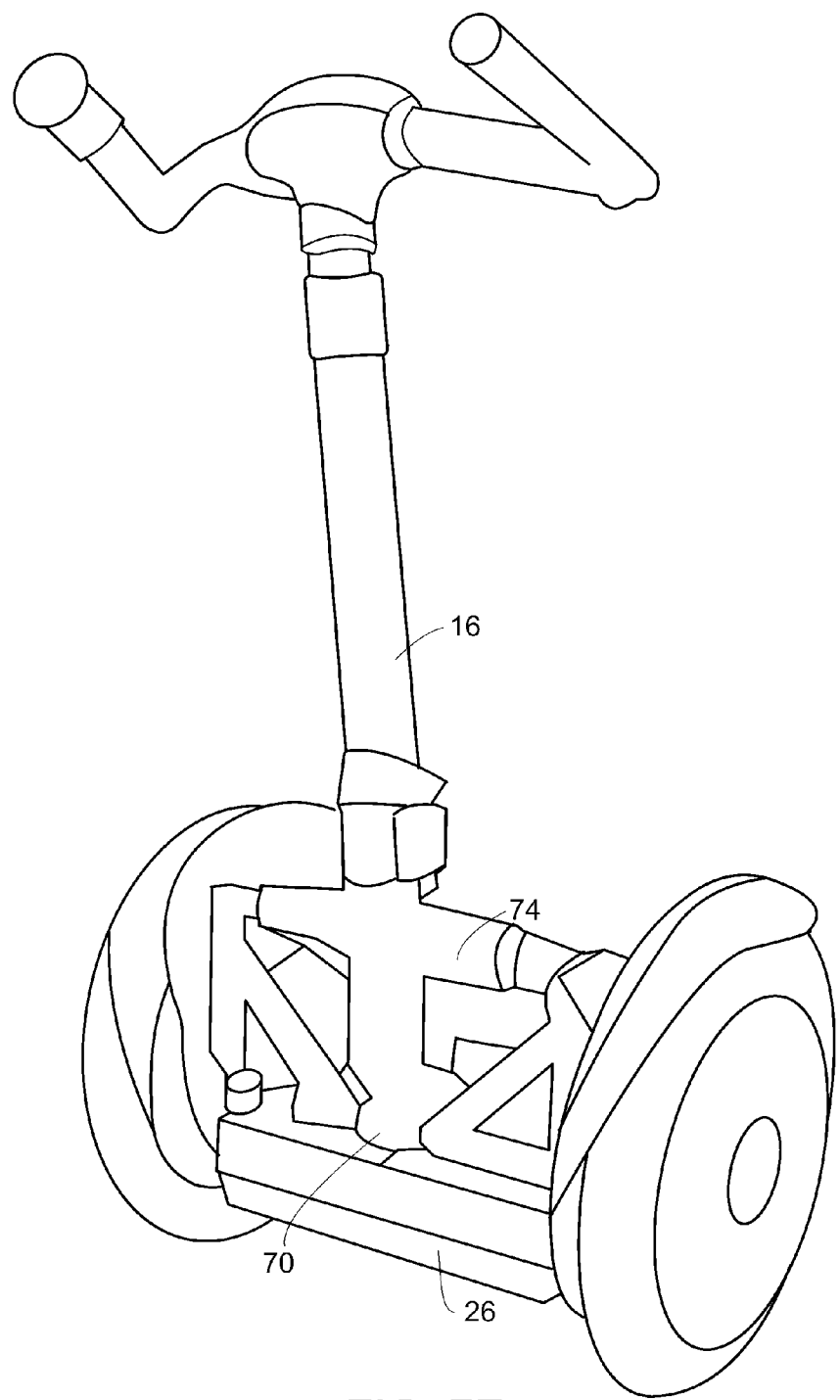
FIG. 7E shows a handlebar lean device for control input to a personal transporter in accordance with embodiments of the present invention.

A handlebar lean device in accordance with a further embodiment of the invention features a pivot mechanism shown in FIG. 7E. Pivot 70 is adjustable in both spring constant and preload, and has a fixed range of motion of ±15°. Preferably, the pivot has an unlimited range of motion. The pivot is mounted as low as possible on the ground-contacting module chassis 26, and the handle 16 is mounted to the rotating portion of the mechanism. A pair of shock absorbers 74 may provide additional damping and stiffness. Shock absorbers 74 are mounted slightly off horizontal to maximize their perpendicularity to the control shaft 16 throughout the range of motion.

Figure 7F:
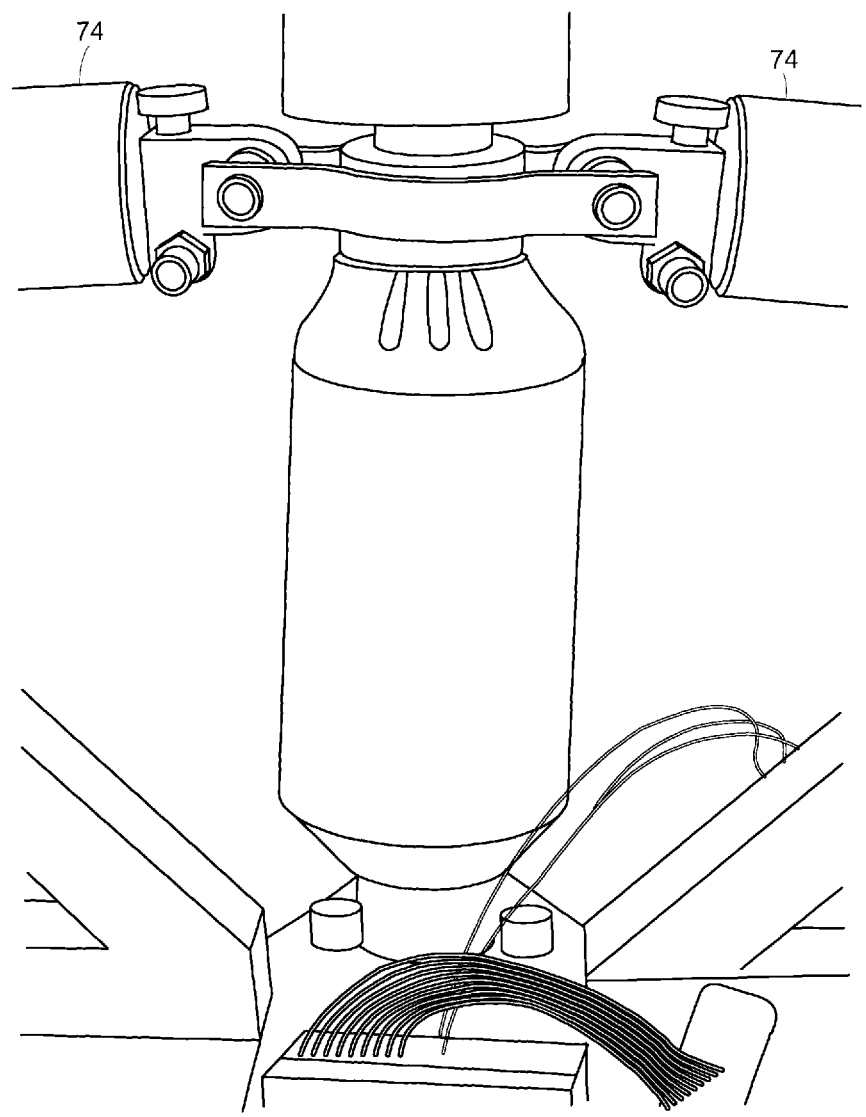
FIG. 7F shows a shock absorber and damping adjustment for use with the embodiment of the invention depicted in FIG. 7A.

The shocks are adjustable in both spring constant and damping. The spring constant is adjustable by pressurizing the shock air reservoir. The damping adjustment is made with a knob that varies an orifice size internal to the shock. Shock absorbers 74 are shown in FIG. 7F. Internal to the pivot mechanism is a cam and spring loaded follower. The cam compresses the follower springs, which generates the restoring spring force. To change the spring constant, a different cam is substituted in the pivot and some cases the number of Belleville springs is changed. The preload is adjusted externally using a screw, which moves a wedge to position the Belleville spring stack. Various degrees of stiffness may be provided by interchangeable cams.

With the stiffest cam installed and the shock absorbers at ambient pressure, a preload of approximately 8 lbs. results, as measured at the handlebar. Approximately 40 pounds of force are required to deflect the handlebar to its full 15° travel.

One issue that must be addressed in handlebar lean control is the effect of terrain sensitivity. If the machine is driven over obstacles or rough terrain, a roll disturbance is forced on the machine/rider system since the resulting change in position of the user may cause an unintended yaw input is put into the system. Yaw control modalities that depend upon the overall body lean of a standing person are prone to be more sensitive to terrain than, say, yaw control by means of a twist grip.

To combat this roll sensitivity, a roll compensation algorithm may be employed. In such an algorithm, the yaw input is modified to compensate for the roll angle of the chassis, making the yaw input the angle of the handlebar with respect to gravity. Since it is easier for the user to maintain body position with respect to gravity rather than the platform, this facilitates rejection of roll disturbances.

In accordance with certain embodiments of the invention, a method for reducing terrain sensitivity employs an algorithm for filtering yaw inputs based on the roll rate of the chassis. The instantaneous rate of rolling, referred to as Roll Rate, is readily available from the Pitch State Estimator, such as that described, for example, in U.S. Pat. No. 6,332,103, which derives the orientation of the transporter based on one or more gyroscopes, an inclinometer, or combinations of the above. Large roll transients cause the rider to be accelerated and, if the roll transients were to be rigidly coupled, through the rider, to the yaw control mechanism, they would cause unintended yaw input.

There are two distinct parts of the solution: rejecting terrain while riding straight and rejecting terrain while turning; the first is a special case of the second. While disabling yaw during periods of large roll rates would solve the problem for motion in a fixed direction, more input is required in order to decouple roll from steered motion.

An unknown input is an estimate of the "intended" yaw input from the rider, i.e. the intention, say, to ride around in a 20' circle. While this information is not directly available, it can be usefully inferred from the history of the yaw input. Simply low-pass filtering the data provides an estimate of yaw input. However, this causes a response delay that is noticeable to the rider. On the other hand, if low-pass filtered data are used only when high roll rates are present, the rider is less likely to notice the delay. The algorithm, then, in accordance with a preferred embodiment of the invention, employs a mixer, controlled by roll rate, between direct yaw input and a heavily filtered version.

A transfer function models the amount of roll rate that will couple into the yaw signal. It is a function of various factors, including the design of the yaw input, the rider's ability, and how the rider is holding on to the yaw input. By using this mixing method, the transfer function can largely be ignored or at most minimized through tuning.

The four main tuning points are: How fast the mixer slews to the filtered version, how fast the mixer slews back, what threshold the mix starts and ends, and the corner frequency of the low pass filter (LPF) on yaw input. There are limits to the amount of un-commanded yaw that can be removed due to setting the mix threshold. By setting it high there is more un-commanded yaw, by setting it low there are more false trips and the rider will begin to notice the time lag on the yaw signal. Setting the LPF frequency also has tradeoffs. If yaw is too heavily filtered, then there will be a noticeable delay and a possibility of yaw transients coupling in from the past. Setting it too low reduces the ability of the mixer to remove the transients.

Figure 7G:
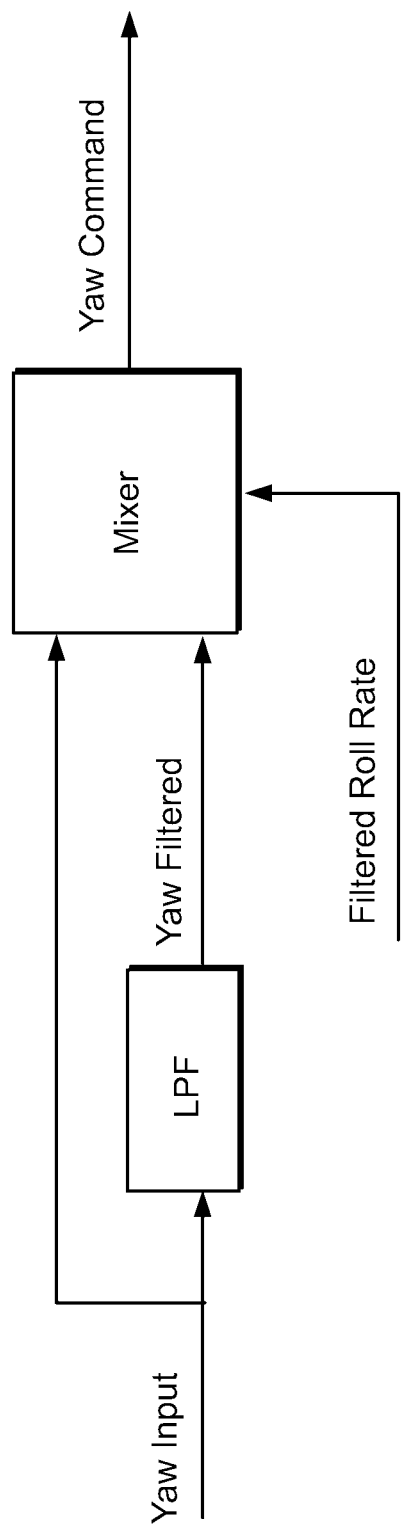
FIG. 7G is a block schematic of a mixer block for combining yaw input and roll information in accordance with embodiments of the present invention.

Referring now to FIG. 7G, the mixer block is defined as:

yaw command=$F$*Yaw Input+$(1-F)$*Yaw Filtered, where F is the mixer function which is a continuously varying signal between 0.0 and 1.0.

Figure 7H:
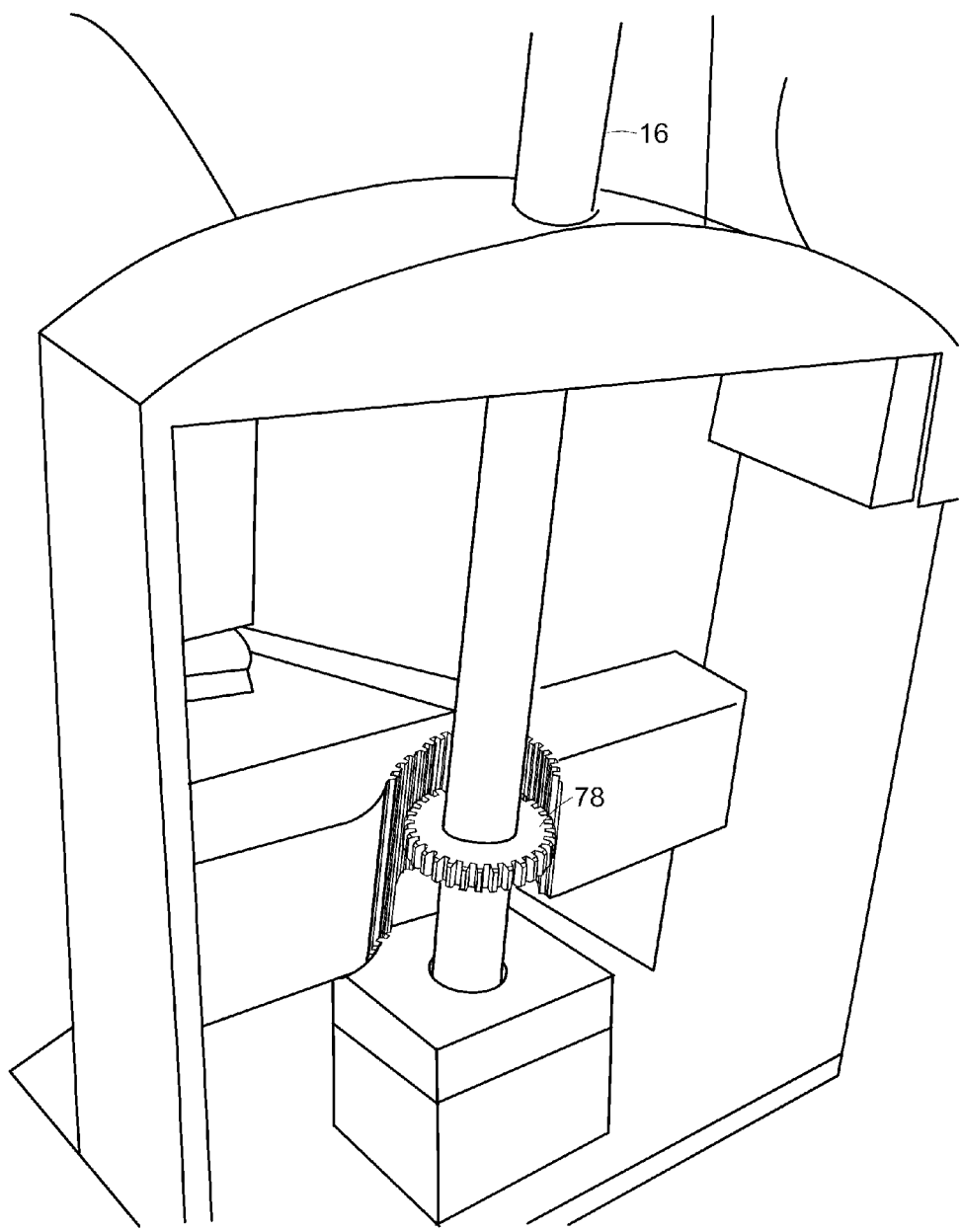
FIG. 7H shows a handlebar bearing and détente allowing the rotational degree of freedom of the handlebar to be locked in accordance with an embodiment of the present invention.

In accordance with various further embodiments of the invention, unintended yaw control is reduced while reacting against the shaft to reposition the body of the rider. The center of rotation at the handlebar may be repositioned, allowing the user to pull laterally on the bar without causing any displacement. In another embodiment, shown in FIG. 7H, shaft 16 is free to move in two coupled degrees of freedom. The user is able lock the bar by limiting one DOF by engaging gears 78 when they are needed to react against the bar. A yaw command may be comprised of an admixture, linear or otherwise, of inputs derived from torque of shaft 16 about its axis and from motion of shaft 16 with respect to the vertical direction.

Alternatively, a force or torque input may be used. A lateral force load cell allows the user to torque the bar in order to reposition it. Likewise, a torque sensitive bar may be provided to allow the user to pull laterally on the bar.

Another issue that must be addressed in handlebar lean control is the effect of turning while moving backwards or in reverse. As described supra, the system may deal with lean turning while moving backward, by switching the direction of the yaw command, to perform a "S-turn" or a "C-turn". Preferably, the system performs a "S-Turn". The system may further compensate for the dynamics of turning while moving backward by desensitizing the lean steering movement. Desensitizing the lean steering while reversing can advantageously facilitate using the same equations to generate the yaw command, the resulting system has positive feedback.

Any of these foregoing embodiments may be combined, within the scope of the present invention, with a rotary yaw control input device such as that depicted in FIGS. 3A-3C. In this arrangement the rotary control is used for low speed yaw, and the lean device would be used to command lateral acceleration at higher speeds.

Active Handlebar

In accordance with further embodiments of the invention, an active handlebar system provides for active control of the handlebar angle with respect to the chassis. The handlebar is mounted on a powered pivot. The handlebar is positioned with respect to the chassis based on lateral acceleration and roll angle of the chassis. If the user maintains good coupling with the handlebar, the bar provides assistance in positioning their body to improve lateral stability. A skilled user leans automatically with the bar, exerting almost no lateral force. If an unexpected obstacle or turn is made, however, the active bar can provide assistance to even the most experienced operator. This system is also particularly useful on slopes, both while traversing and during turning maneuvers.

In order to keep the user most stable, the bar should be positioned parallel the resultant vector of lateral acceleration and gravity. In the system described here, lateral acceleration was determined only using the wheel velocities, without taking advantage of any other available state estimator information. Lateral acceleration is given by the equation:

$$a_{lat} = \omega v$$

Where $\omega$ is the yaw rate and $v$ is the velocity of the transporter. $\omega$ is based on the difference in wheel velocities ($V_l$ and $V_r$) and the wheel track, T.

$$\omega = \frac{V_l - V_r}{T}$$

v is determined by the average wheel velocity:

$$v = \frac{V_l + V_r}{2}$$

Combing these equations gives:

$$a_{lat} = \frac{(V_l - V_r)}{T} \cdot \frac{(V_l + V_r)}{2} = \frac{V_l^2 - V_r^2}{2T}$$

Since $\tan(a_{lat}) \approx a_{lat}$ for small angles, the bar position from vertical is proportional to the difference in the square of each wheel speed. This position must be compensated by adding the roll angle of the chassis, which results in a handlebar position based on the vector sum of lateral acceleration and the acceleration due to gravity.

Figure 8A:
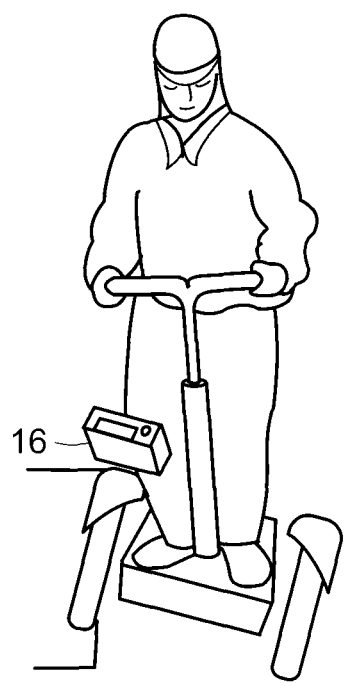
FIG. 8A shows the response of the active handlebar to a roll disturbance, in accordance with an embodiment of the present invention.
Figure 8B:
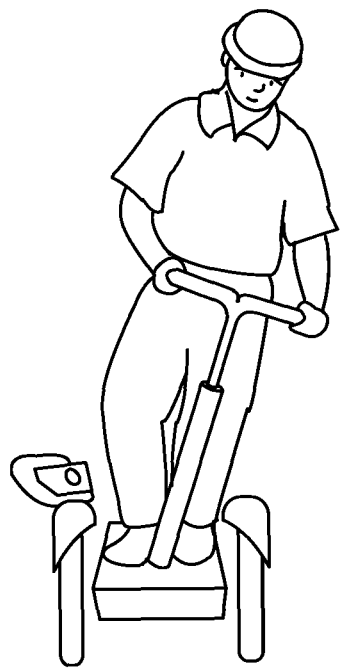
FIGS. 8B and 8C show front and back views of active handlebar response during a high-speed turn, in accordance with an embodiment of the present invention.
Figure 8C:
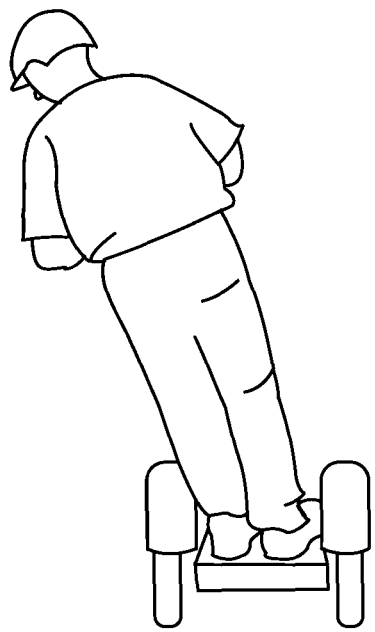

The operation of the active handlebar is further described as follows. The user commands yaw, such as with the rotary yaw input shown in FIGS. 3A-3C. The user may allow the active bar to assist in the user's positioning by rigidly coupling to the handlebar with his arms, or he can maintain a softer coupling and use the active bar to provide him with feedback. In another embodiment, the user preferably commands yaw with the lean of the handlebar as shown in FIGS. 8A-8C. FIGS. 8A-8C show the handlebar response to roll and turning events. Note, in FIG. 8C, the alignment of the handlebar with the user's legs.

Figure 9A:
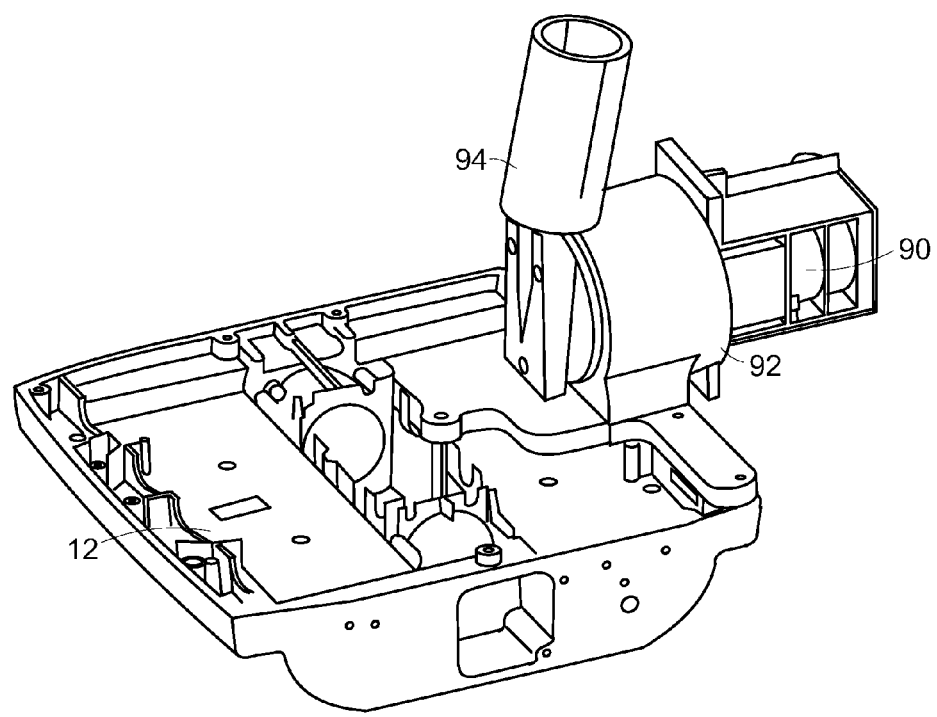
FIGS. 9A and 9B show the basic mechanical hardware layout of the powered handlebar embodiment of FIGS. 8A-8C.
Figure 9B:
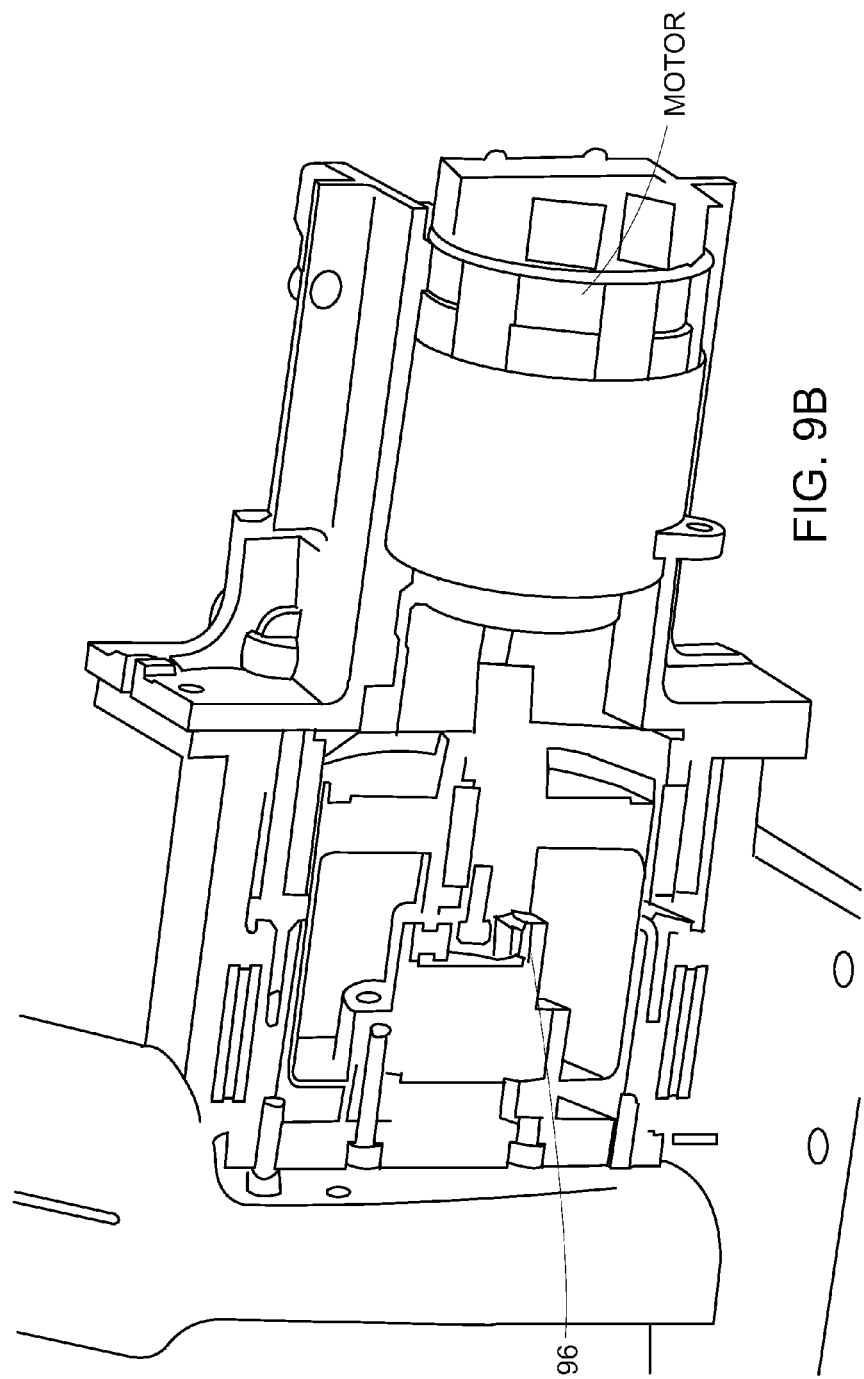

FIGS. 9A and 9B show the basic mechanical hardware layout of a powered pivot. The powered pivot is made up of a harmonic drive reduction unit 92 powered by an electric motor 90. The output of the drive is coupled to the control shaft via an adapter 94. The powered pivot creates a torque between the chassis 12 and the control shaft 16 (shown in FIG. 8A), which can be regulated to provide the position control required by the active handlebar system. A harmonic drive is a very compact high reduction ratio gear set that is efficient and backdriveable. It works by using an elliptical bearing, called the "wave generator", to "walk" a slightly smaller flexible gear 96, called the "flex spline" around the inside of a larger rigid gear, called the "circular spline". Suitable harmonic drives are available from HD Systems, Inc. of Hauppauge, N.Y. and are described in the appended pages.

The active handlebar system uses standard algorithms to control the wheels. The handlebar is controlled with a position loop that commands a position proportional to the difference in the square of the wheel velocities. Although a theoretical gain can be calculated and converted to the proper fixed point units, in practice it was determined empirically.

The position loop is a standard PID loop using motor encoder data for feedback. The tuning objectives are good ramp tracking, minimum settling time, and minimum overshoot. The loop was tuned using a modified triangle wave.

The handlebar controller used the position at startup as the zero (center) position. The user had to position the bar and hold it centered at startup. Absolute position feedback may be provided to allow the bar to self-center.

Some filtering and dead banding are done to the command before commanding the motor. In a specific embodiment, the filtering was ultimately needed to smooth out any noise on the wheel speeds and dead banding was used to keep the bar still when turning in place on slightly inclined terrains. A 1 Hz first order filtered estimate of lateral acceleration is multiplied by a first gain (typically, on the order of 0.001) and roll compensated by adding roll angle multiplied by a second gain (typically, on the order of 0.15). Afterwards a software induced dead band, and later compensation, of 15% of the max motor position command (typically, 400 counts.) The final result is filtered by a 0.2 Hz filter. This filter may be used to round out the knee introduced at the dead band and to slow down the movement of the handlebar.

Further Mechanical Sensing of Body Position

In accordance with other embodiments of the invention, the position of the rider's body, or of one or more parts thereof, may be sensed mechanically as a means to command yaw or fore/aft motion of a personal transporter. One such embodiment has been described with reference to FIG. 5B. In accordance with another such embodiment, described with reference to FIG. 10A, body sensing is accomplished by a device 910 that tracks the motion of the right knee through a pivot 912 in line with the ankle. Pivot 912 is instrumented with a potentiometer 914, with potentiometer gains adjusted appropriately to the range of motion of the knee. A controller distinguishes between rider motion intended as account for input anomalies caused by terrain. The rider commands a yaw input by shifting his body in the direction he would like to turn, as an experienced rider of a personal transporter would do, shifting his center of gravity towards the inside of the turn to prevent the centripetal acceleration of the powerbase from pulling his feet from under him.

The yaw input device tracks body position by recording the motion of the right knee as it rotates about a longitudinal axis through the right ankle. The rider interacts with the device through a cuff 910 which fits closely around the upper shin just below the knee. The cuff is height-adjustable and padded to allow a snug fit without discomfort. The cuff is attached via an arm to a pivot ahead of the foot, located such that its axis runs longitudinally in relation to the chassis, and in line with the ankle. (Anthropometric data from Dreyfuss Associates' *The Measure of Man and Woman* suggested the ankle pivot should be approximately 4" from the baseplate for an average rider wearing shoes). A potentiometer records the angle of the arm in a manner very similar to the twist-grip yaw input device described above with reference to FIGS. 3A-3C.

A mechanical body position yaw input device incorporates a centering mechanism that is described with reference to FIG. 10B. A centering mechanism 920 returns the device to neutral (no yaw input) position when the rider is not in contact with the mechanism, and provides tactile feedback to the user as to the location of the neutral position. Preload (adjustable by adding or subtracting washers) was set such that the rider needed to exert a force of 1 kg to move the device from center. At maximum travel (25° in either direction) the rider experiences a force of approximately 2 kg.

In addition to the pivot axis on which the potentiometer is located, there is another non-encoded axis at ankle height, perpendicular to the first, which allows the cuff to move with the knee as the rider bends knees and ankles during active riding. A torsion spring acts about this non-encoded axis to keep the cuff pressed firmly against the rider. The spring is not preloaded and generates approximately 20 kg/mm per degree, such that the rider experiences a force of 1.5 kg at his knee in a typical riding posture (25° forward of unloaded position) and 3 kg at full forward travel (50°. At full forward position there is a stop which allows the rider to command pitch torque to the chassis through forward knee pressure.

Due to variations in the underlying terrain, there are situations in which the rider's body position does not necessarily correlate to intended yaw input. One situation is traversing a sideslope, during which time the rider will need to lean uphill to stay balanced. Another situation is striking an obstacle with one wheel, which may cause the machine to roll sharply while the rider stays upright. During both of these situations the potentiometer will record that the body position has moved relative to the machine, which is normally interpreted as a yaw command. While terrain-induced body position presents a challenge to a system which translates body position into yaw, steps can be taken to mitigate these situations. A system discussed below addresses the terrain-induced yaw inputs described above with separate algorithms for side slopes and sudden wheel impacts.

On machines with yaw inputs derived from body position it is necessary to compensate for the difference in roll angle to the bodies' natural tendency to line up with gravity. The only exception to this is the case where there is a sufficient restoring force on the yaw input to overcome the rider's natural tendency to keep the yaw input in-line with their body.

In order to roll compensate the yaw input a calculation needs to be made. This calculation entails measuring the amount of roll angle that couples into the yaw input. The following function is used to calculate a roll compensated yaw input:

roll compensated yaw input=yaw input−
(Gain_RollContributionToYawInput*roll).

For example: Gain_RollContributionToYawInput=(1.44/1.0), where 1 count of roll gives 1.44 counts of yaw.

In accordance with another embodiment of the invention, the rider may hit a button which resets their current knee position as neutral.

Although there is no measurable backlash in the centering device, the mechanism can flex before overcoming the centering device preload. This translates to about 1° of knee motion in either direction which does not command a yaw. This can be reduced by increasing the stiffness of the structure relative to the preload. A loose fit between the knee cuff and the knee adds an additional 1-2° of motion that does not produce a signal.

Additionally, the potentiometer may exhibit hysteresis, which may be compensated by addition of a software dead band. Dead band has the advantage of allowing the rider a small amount of motion, which reduces fatigue. However, precision and slalom performance is compromised by dead band. User-adjustable or speed-sensitive deadband may also be embodied.

Asymmetrical gains may be useful to compensate for the asymmetry inherent in measuring the motion of one of two legs. Since body position determines yaw input, appropriate mapping of rider position to lateral acceleration at speed is more significant in this device than in a hand-steered device.

Figure 10C:
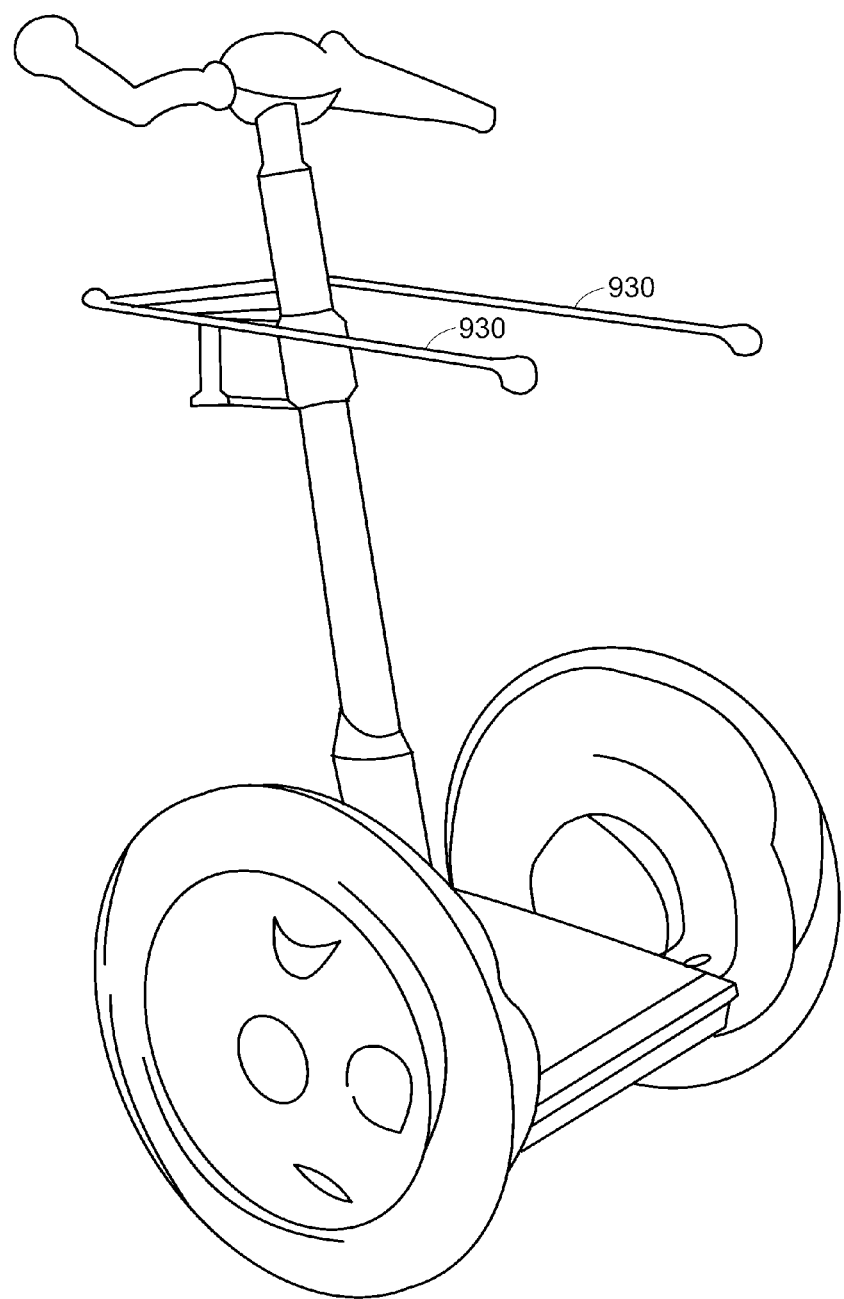
FIG. 10C shows hip position sensors for providing user yaw input in accordance with an embodiment of the present invention.

In accordance with another embodiment of the invention, described with reference to FIG. 10C, two steel "whiskers" 930 (approximately 50 cm long and 35 cm apart), are provided at approximately hip height. Leaning left or right pushes on the whiskers and twist the potentiometer (gains are doubled in software). The length of the whiskers is preferred so that the rider, in the course of leaning backwards and forwards, does not exit the device and lose yaw input capability.

Figure 10D:
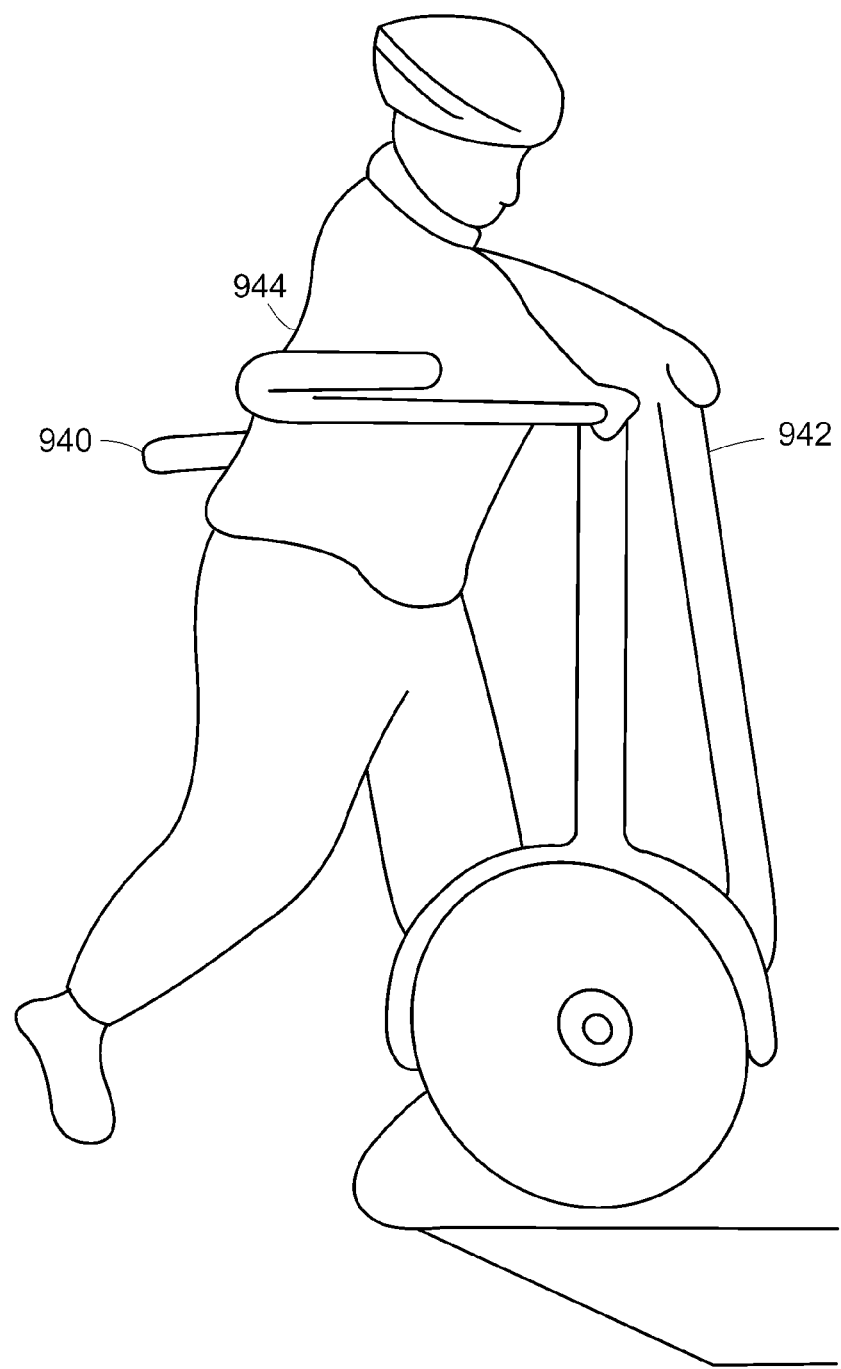
FIG. 10D shows a torso position sensor for providing user yaw input in accordance with an embodiment of the present invention.

Another embodiment of the invention, discussed with reference to FIG. 10D, employs two body torso position sensors 940 with handgrips 942 bolted to either side of the chassis. Smooth planks 944 (approximately 60 cm long and adjustably spaced), are attached to a leaning shaft on either side of the rider's ribcage to sense body position above the waist so as to account for body lean accomplished by bending at the waist. A longitudinal axis of rotation advantageously eliminates lean-sensitive gains that might be present in other designs.

Linear Slide Directional Input

The "linear slide" directional input device is a shear force sensitive means of steering a personal transporter. The device has a platform that can slide in the lateral direction of the machine, directly in line with lateral accelerations seen during turning.

During a turn the user feels a lateral acceleration in the vehicle frame of reference. The lateral acceleration causes a shear force between the user and the vehicle, which is reacted through the footplate and the handlebar. Because the user has two points to react this force, one can be used as a directional input driven through the other. In this implementation the user reacts on the handlebar. The linear slide mechanism measures this reaction through displacement of the platform, and uses it as a directional command. This input method is directly coupled to lateral acceleration, with the user modulating the coupling by reacting off the handlebar. At zero lateral acceleration, the user can create a directional input by pushing laterally on the handlebar. At non-zero acceleration, the user's handlebar force adds to the lateral acceleration force to create the input.

Figure 11:
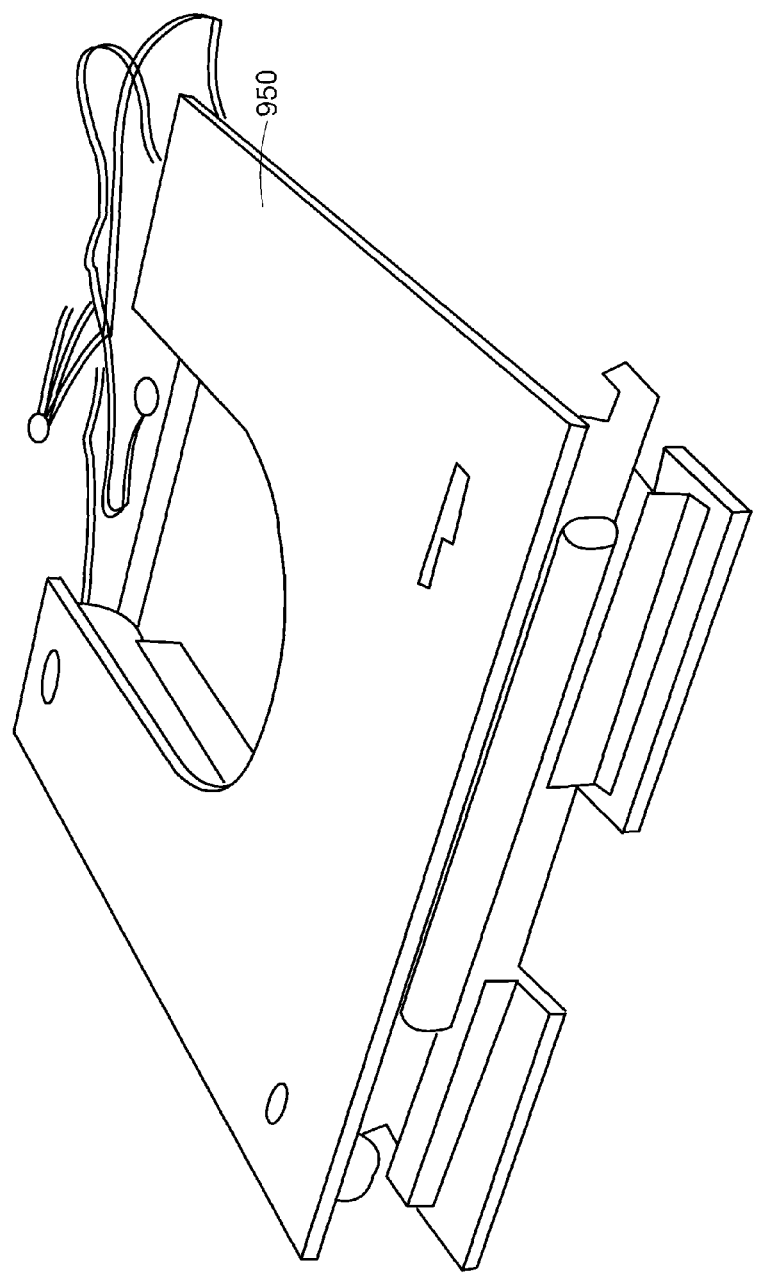
FIG. 11 depicts a linear slide footplate mechanism in accordance with yet another embodiment of the present invention.

The linear slide mechanism was designed to sit on top of the chassis of a personal transporter, replacing the foot mat assembly. It is marginally smaller that the existing foot plate area to allow for plate displacement. The platform wraps around the control shaft base. The maximum platform travel is approx +/−1 inch. The footplate mechanism 950 is shown in FIG. 11.

The assembly is clamped to the platform of a human transporter with four blocks that capture the base plate of the slide. The blocks allow the assembly to move vertically in order to activate the rider detect switches. Because the weight of the assembly alone is sufficient to activate the switches, it is counterbalanced with two ball plungers. These insure that the rider detect switches only activate when a rider is on the transporter.

The upper platform rides on ½ inch linear ball bearings which, in turn, ride on a ground rod mounted to the lower platform. A spring and stop arrangement provides preloaded centering force.

A linear potentiometer converts the platform position to an analog voltage, which is input to the user interface circuit board in place of the potentiometer employed in conjunction with the twist grip embodiment described above with reference to FIG. 3.

Algorithms for operation of the linear slide yaw input are essentially those of the twist grip yaw input, as described in detail in U.S. Pat. No. 6,789,640, albeit with an opposite yaw gain polarity.

Several embodiments of the invention are related to the device just described. In accordance with one embodiment, individual pivoting footplates are shear sensitive and pivot at a point above the surface of the plate, preferably 4 to 6 inches above the surface. This allows some lateral acceleration coupling, but give the user the ability to stabilize the coupling through leg or ankle rotation.

Alternatively, the linear slide may be moved to the handlebar. This allows a user to use his legs for reacting to lateral accelerations without commanding input. However, since most of the lateral acceleration is reacted in the legs, coupling with lateral acceleration is largely lost by moving the linear slide to the handlebar.

Speed Limiting

In a further embodiment, any of the foregoing embodiments of a vehicle in accordance with the present invention may be provided with speed limiting to maintain balance and control, which may otherwise be lost if the wheels (or other ground-contacting members) were permitted to reach the maximum speed of which they are currently capable of being driven.

Speed limiting is accomplished by pitching the vehicle back in the direction opposite from the current direction of travel, which causes the vehicle to slow down. (As discussed above, the extent and direction of system lean determine the vehicle's acceleration.) In this embodiment, the vehicle is pitched back by adding a pitch modification to the Pitch State Estimator pitch value. Speed limiting occurs whenever the vehicle velocity of the vehicle exceeds a threshold that is the determined speed limit of the vehicle. The pitch modification is determined by looking at the difference between the vehicle velocity and the determined speed limit, integrated over time.

Alternatively, the balancing margin between a specified maximum power output and the current power output of the motors may be monitored. In response to the balancing margin falling below a specified limit, an alarm may be generated to warn the user to reduce the speed of the vehicle. The alarm may be audible, visual, or, alternatively the alarm may be tactile or may be provided by modulation of the motor drives, providing a 'rumbling' ride that is readily perceived by the user.

The automatic pitch modification sequence, in response to a detected speed at a specified speed limit, is maintained until the vehicle slows to the desired dropout speed (some speed slightly below the speed limit), and then the pitch angle is smoothly returned to its original value.

One method for determining the speed limit of the vehicle is to monitor the battery voltage, which is then used to estimate the maximum velocity the vehicle is currently capable of maintaining. Another method is to measure the voltages of the battery and the motor and to monitor the difference between the two; the difference provides an estimate of the amount of velocity margin (or 'balancing margin') currently available to the vehicle.

The described embodiments of the invention are intended to be merely exemplary and numerous variations and modifications will be apparent to those skilled in the art. In particular, many of the controllers and methods of direction and speed control described herein may be applied advantageously to personal transporters that are not balancing personal transporters. Balancing transporters present particular requirements for combining yaw and balance controls, as discussed in the foregoing description and in U.S. Pat. No. 6,789,640. All such variations and modifications are intended to be within the scope of the present invention as defined in any appended claims.

What is claimed is:

1. A vehicle for carrying a load comprising:
   a ground-contacting module including a platform, the ground-contacting module further including two wheels and a motorized drive arrangement;
   a plurality of sensors in electronic communication with the controller and the ground-contacting module; and
   a controller maintaining the vehicle in a balanced state, the controller maintaining a plurality of control modes including at least a first mode specifying an absence of the load on the platform, the first mode specifying that the vehicle is maintained at a position, the controller determining a first torque to be applied to the two wheels to maintain vehicle balance when the controller is in the first mode, the controller automatically entering the first mode based at least in part on data from at least one of the plurality of sensors, the controller providing the first torque to the motorized drive arrangement when the controller is in the first mode.

2. The vehicle of claim 1, further comprising an articulated handle articulating about a pivot, the articulated handle including a distal end and a proximal end, the proximal end coupled to the platform.

3. The vehicle of claim 2, wherein the pivot is located proximally to the platform with respect to the distal end of the articulated handle.

4. The vehicle of claim 1, further comprising a directional input providing a turning command to the controller, the turning command based at least in part on displacement of the directional input.

5. The vehicle of claim 4, wherein at least one of the plurality of modes comprises a second mode specifying if the vehicle is transporting the load, and wherein the controller determines a second torque to be applied to the two wheels to maintain the transporting when the vehicle is in the second mode, the second torque being based at least in part on data from the plurality of sensors and the turning command, the controller applying the second torque when the vehicle is in the second mode.

6. The vehicle of claim 5, wherein the controller automatically enters the second mode based on data from the plurality of sensors indicating the presence of the on the platform.

7. The vehicle of claim 1, wherein at least one of the plurality of modes comprises a third mode specifying an absence of the load on the platform, the third mode specifying if movement of the vehicle is user-controlled, and wherein the controller determines a third torque to be applied to each of the two wheels to drive the two wheels in the same direction when the vehicle is in the third mode, the third torque being based at least in part on data from the plurality of sensors, the controller applying the third torque when the vehicle is in the third mode.

8. The vehicle of claim 1, wherein at least one of the plurality of sensors comprises an inertial sensor.

9. The vehicle of claim 8, wherein the controller determines the first torque depending at least in part on a pitch sensed by the inertial sensor.

10. The vehicle of claim 1, wherein the plurality of sensors comprises at least one load sensor including a foot activated switch sensitive to the load on the platform.

11. A vehicle for carrying a load, the vehicle comprising:
a ground-contacting module including a platform, two laterally disposed wheels, a motorized drive arrangement imparting a first torque to the two laterally disposed wheels;
a plurality of sensors in electronic communication with the controller and the ground-contacting module; and
a controller maintaining the vehicle in a balanced state, the controller maintaining a plurality of control modes including at least a kickstand mode specifying an absence of the load on the platform, the kickstand mode specifying that the vehicle is maintained at a position, the controller executing a control loop determining the first torque to be applied to the two laterally disposed wheels to maintain the vehicle balanced in place, the controller automatically entering the kickstand mode based at least in part on data from at least one of the plurality of sensors, the controller automatically providing the first torque to the motorized drive arrangement when the controller is in the kickstand mode.

12. The vehicle of claim 11, wherein at least one of the plurality of modes comprises a transport mode specifying if the vehicle is transporting the load, and wherein the controller determines a second torque to be applied to the two wheels to maintain the transporting when the vehicle is in the transport mode, and wherein the vehicle includes a directional input providing a turning command to the controller, the turning command based at least in part on displacement of the directional input, the second torque based at least in part on data from the plurality of sensors and the turning command, the controller applying the second torque when the vehicle is in the transport mode.

13. The vehicle of claim 12, wherein the controller automatically enters the transport mode based on data from the plurality of sensors indicating the presence of the load on the platform.

14. The vehicle of claim 11, wherein at least one of the plurality of modes comprises a transport mode specifying if the vehicle is transporting the load, and wherein the controller executes a control loop coupled to the motorized drive arrangement, the control loop determining a third torque to be applied to the two laterally disposed wheels to maintain the transporting when the vehicle is in the transport mode, and wherein the vehicle includes a directional input receiving a turning command based at least in part on displacement of the directional input, the third torque depending at least in part on data from the plurality of sensors and the turning command, and wherein the controller applies the third torque when the vehicle is in the transport mode.

15. The vehicle of claim 11, wherein at least one of the plurality of modes comprises a drive mode specifying an absence of the load on the platform, the drive mode specifying if movement of the vehicle is user-controlled, and wherein the controller determines a fourth torque to be applied to each of the two wheels to drive the two wheels in the same direction when the vehicle is in the drive mode, the fourth torque being based at least in part on data from the plurality of sensors, and wherein the controller applies the fourth torque when the vehicle is in the drive mode.

16. A method for controlling a vehicle, the vehicle including a ground-contacting module in an initial unbalanced state, a controller in electronic communication with the ground-contacting module, and a plurality of sensors in electronic communication with the ground-contacting module and the controller, the method comprising:
receiving, by the controller, data from the plurality of sensors indicating a riderless mode specifying when a load is absent from the vehicle;
determining, by the controller, a first torque to be applied to the ground-contacting module to balance the vehicle at a position, the first torque based at least in part on the data when the vehicle is in the riderless mode; and
automatically applying, by the controller, the first torque to the ground-contacting module.

17. The method as in claim 16, further comprising:
receiving, by the controller, a turning command based on a displacement of an input device electronically coupled with the controller;
receiving, by the controller, data from the plurality of sensors indicating a loaded mode specifying when the load is present on the vehicle; and
determining, by the controller, a second torque to be applied to the ground-contacting module when the vehicle is in the loaded mode, the second torque based at least in part on data from the plurality of sensors and the turning command.

18. The method as in claim 17, wherein the input device comprises a joystick.

19. The method as in claim 17, further comprising:
applying, by the controller, the second torque when the vehicle is in the loaded mode.

20. The method of claim 16, further comprising:
receiving, by the controller from the plurality of sensors, a pitch of at least a portion of the vehicle; and
determining, by the controller, the first torque based at least in part on the pitch.

* * * * *

UNITED STATES PATENT AND TRADEMARK OFFICE
CERTIFICATE OF CORRECTION

PATENT NO. : 9,442,491 B2  
APPLICATION NO. : 14/620284  
DATED : September 13, 2016  
INVENTOR(S) : Dean Kamen et al.

Page 1 of 1

It is certified that error appears in the above-identified patent and that said Letters Patent is hereby corrected as shown below:

On the Title Page

In the References Cited:
Under U.S. Patent Documents:
Page 2, U.S. "D880,823" should be replaced with --0880823--

Under Foreign Patent Documents:
Page 5, "JP 1314974" should be replaced with --JP D1314974--

Page 5, "JP 1323922" should be replaced with --JP D1323922--

Page 5, "TW 124942" should be replaced with --TW D124942--

Page 5, "TW 124943" should be replaced with --TW D124943--

Under Other Publications:
Page 6, Document 031416, please insert --investigation # 337-TA-935, 3-14-16-- after ITC Signed and Sealed this  
Third Day of January, 2017

Michelle K. Lee  
*Director of the United States Patent and Trademark Office*